US009838321B2

(12) United States Patent
Contavalli

(10) Patent No.: US 9,838,321 B2
(45) Date of Patent: Dec. 5, 2017

(54) SYSTEMS AND METHOD FOR SINGLE QUEUE MULTI-STREAM TRAFFIC SHAPING WITH DELAYED COMPLETIONS TO AVOID HEAD OF LINE BLOCKING

(71) Applicant: Google Inc., Mountain View, CA (US)

(72) Inventor: Carlo Contavalli, Millbrae, CA (US)

(73) Assignee: Google LLC, Mountain View, CA (US)

( * ) Notice: Subject to any disclaimer, the term of this patent is extended or adjusted under 35 U.S.C. 154(b) by 125 days.

(21) Appl. No.: 15/066,411

(22) Filed: Mar. 10, 2016

(65) Prior Publication Data
US 2017/0264554 A1 Sep. 14, 2017

(51) Int. Cl.
H04L 12/815 (2013.01)
H04L 12/801 (2013.01)

(52) U.S. Cl.
CPC ............ H04L 47/22 (2013.01); H04L 47/193 (2013.01)

(58) Field of Classification Search
CPC .......................... H04L 47/22; H04L 47/193
See application file for complete search history.

(56) References Cited

U.S. PATENT DOCUMENTS 7,046,628 B2   5/2006  Luhmann et al.
7,929,433 B2 * 4/2011  Husak ............... H04L 47/15
                                                    370/229
8,861,538 B2   10/2014 Deisinger et al.
2011/0255542 A1 10/2011 Hass et al.
2014/0064294 A1 3/2014  Deisinger et al.

OTHER PUBLICATIONS

Extended European Search Report dated Jul. 6, 2017 in European Patent Application No. 16207092.4 (15 pages).
Intel, White Paper, Intel VMDq Technology, Notes of Software Design Support for Intel VMDq Technology, Revision 1.2, Mar. 2008. Retrieved from URL: https://www.intel.com/content/dam/www/public/us/en/documents/white-papers/vmdq-technology-paper.pdf.

* cited by examiner

Primary Examiner — Ronald B Abelson
(74) Attorney, Agent, or Firm — McDermott Will & Emery LLP

(57) ABSTRACT

Systems and methods of performing traffic shaping in a network device are provided. A network interface driver of the network device can store descriptors associated with packets received from multiple streams in a transmission queue in a first order. The network interface driver can transfer the descriptors to a traffic shaping module. In response to determining that a packet from a first stream, among the received packets, has been successfully transmitted by a network card, the network interface driver can communicate a packet transmission completion message corresponding to the packet to a software application that has awaited receipt of a packet transmission completion message before forwarding additional data packets from the first stream to the network interface driver. The network interface driver can communicate packet transmission completion messages corresponding to the packets received from the multiple streams to the software application in a second order, different from the first order.

20 Claims, 17 Drawing Sheets

SYSTEMS AND METHOD FOR SINGLE QUEUE MULTI-STREAM TRAFFIC SHAPING WITH DELAYED COMPLETIONS TO AVOID HEAD OF LINE BLOCKING

BACKGROUND

Traffic shaping is a technique that regulates network data traffic by slowing down a traffic stream determined as less important or less desired than prioritized traffic streams. There are two common mechanisms to slow down a stream: first, dropping or discarding some packets and second, delaying packets. The packet dropping mechanism is used widely and considered as the only viable solution in many cases. For example, traffic shaping, if performed by a separate device to which computers are connected, can be performed by selectively dropping packets.

Alternatively, the packet delaying mechanism can dispense with packet dropping or reduce the number of dropped packets. For example, when a packet is delayed, a feedback mechanism can exert "back pressure," i.e., send a feedback, to a sending module (e.g., device or software component) so as cause a sending module to reduce the rate at which it sends packets. Without such "back pressure," a traffic shaping module will need to keep receiving packets at a faster rate, and need to buffer them until the time at which it can send them at the correct rate. The lack of such "back pressure" will not only prevent an application from being immediately aware of traffic congestion but also degrade the overall throughput and performance of a packet transmission system.

SUMMARY

In one aspect, a system is presented including a network device. The network device includes a network interface driver, a data traffic shaping module and a network card. The network interface card is configured to send a first set of data packets generated and forwarded by a software application for transmission by the network card, store descriptors associated with the received first set of data packets in a primary transmission queue in a first order, and transfer the descriptors associated with the received first set of data packets to the data traffic shaping module executing on one of the network card and at least one processor. In response to determining that a packet of the received first set of packets has been successfully transmitted by the network card, the network interface card is configured to communicate a packet transmission completion message to a software application that has awaited receipt of a packet transmission completion message from the network interface driver before forwarding additional data packets to the network interface driver. The data traffic shaping module is configured to maintain a plurality of traffic shaping queues, each of which has at least one associated transmission rate rule. The data traffic shaping module is further configured to receive the descriptors of data packets transferred by the network interface driver from the primary transmission queue, determine that transmission by the network card has to be delayed, and responsive to such determination, remove the descriptor from the primary transmission queue and store it in a corresponding traffic shaping queue based on a result of the classification. The data traffic shaping module is further configured to cause the network card to transmit the data packets associated with descriptors stored in the secondary traffic shaping queues according to the transmission rate rules associated with the respective traffic shaping queues, and inform the network interface driver of successful transmission of data packets in a second order different from the first order.

In one aspect, a method is presented that includes receiving, by a network interface driver executing on an at least one processor, a first set of data packets generated and forwarded by a software application for transmission by a network card. The method further includes storing, by the network interface driver, descriptors associated with the received first set of data packets in a primary transmission queue in a first order, and transferring by the network interface driver, the descriptors associated with the received first set of data packets to a data traffic shaping module executing on one of the network card and the at least one processor. The method further includes in response to determining that a packet of the received first set of packets has been successfully transmitted by the network card, communicating, by the network interface card, a packet transmission completion message to the software application that has awaited receipt of a packet transmission completion message from the network interface driver before forwarding additional data packets to the network interface driver. The method further includes maintaining, by the data traffic shaping module, a plurality of traffic shaping queues, each of which has at least one associated transmission rate rule, and receiving, by the data traffic shaping module, the descriptors of data packets transferred by the network interface driver from the primary transmission queue. The method further includes classifying, by the data traffic shaping module, the data packets associated with the received descriptors, determining, by the data traffic shaping module, that transmission by the network card of a first data packet associated with a received first descriptor is to be delayed, and responsive to such determination, removing the first descriptor associated with the first data packet from the primary transmission queue and storing the first descriptor in a corresponding traffic shaping queue based on a result of the classification. The method further includes causing, by the data traffic shaping module, the network card to transmit the data packets associated with descriptors stored in the traffic shaping queues according to the transmission rate rules associated with the respective traffic shaping queues, and informing, by the data traffic shaping module, the network interface driver of successful transmission of data packets in a second order different from the first order.

In one aspect, computer-readable media stores instructions that, when executed by a computing processor, cause the computing processor to receive, via a network interface driver executing on the computing processor, a first set of data packets generated and forwarded by a software application for transmission by a network card. The computing processor is further caused to store, via the network interface driver, descriptors associated with the received first set of data packets in a primary transmission queue. The computing processor is further caused to transfer, via the network interface driver, the descriptors associated with the received first set of data packets to a data traffic shaping module executing on one of the network card and the computing processor. In response to determining that a packet of the received first set of packets has been successfully transmitted by the network card, the computing processor is further caused to communicate, via the network interface card, a packet transmission completion message to the software application that has awaited receipt of a packet transmission completion message from the network interface driver before forwarding additional data packets to the network interface driver. The computing processor is further caused to maintain, via the data traffic shaping module, a plurality of traffic shaping queues, each of which has at least one associated transmission rate rule. The computing processor is further caused to receive, via the data traffic shaping module, the descriptors of data packets transferred by the network interface driver from the primary transmission queue; classify, via the data traffic shaping module, the data packets associated with the received descriptors. The computing processor is further caused to determine, via the data traffic shaping module, that transmission by the network card of a first data packet associated with a received first descriptor is to be delayed, and responsive to such determination, remove the first descriptor associated with the first data packet from the primary transmission queue and store the first descriptor in a corresponding traffic shaping queue based on a result of the classification. The computing processor further causes, via the data traffic shaping module, the network card to transmit the data packets associated with descriptors stored in the traffic shaping queues according to the transmission rate rules associated with the respective traffic shaping queues. The computing processor is further caused to inform, via the data traffic shaping module, the network interface driver of successful transmission of data packets.

BRIEF DESCRIPTION OF THE DRAWINGS

The above and related objects, features, and advantages of the present disclosure will be more fully understood by reference to the following detailed description, when taken in conjunction with the following figures, wherein.

DETAILED DESCRIPTION

Figure 1:
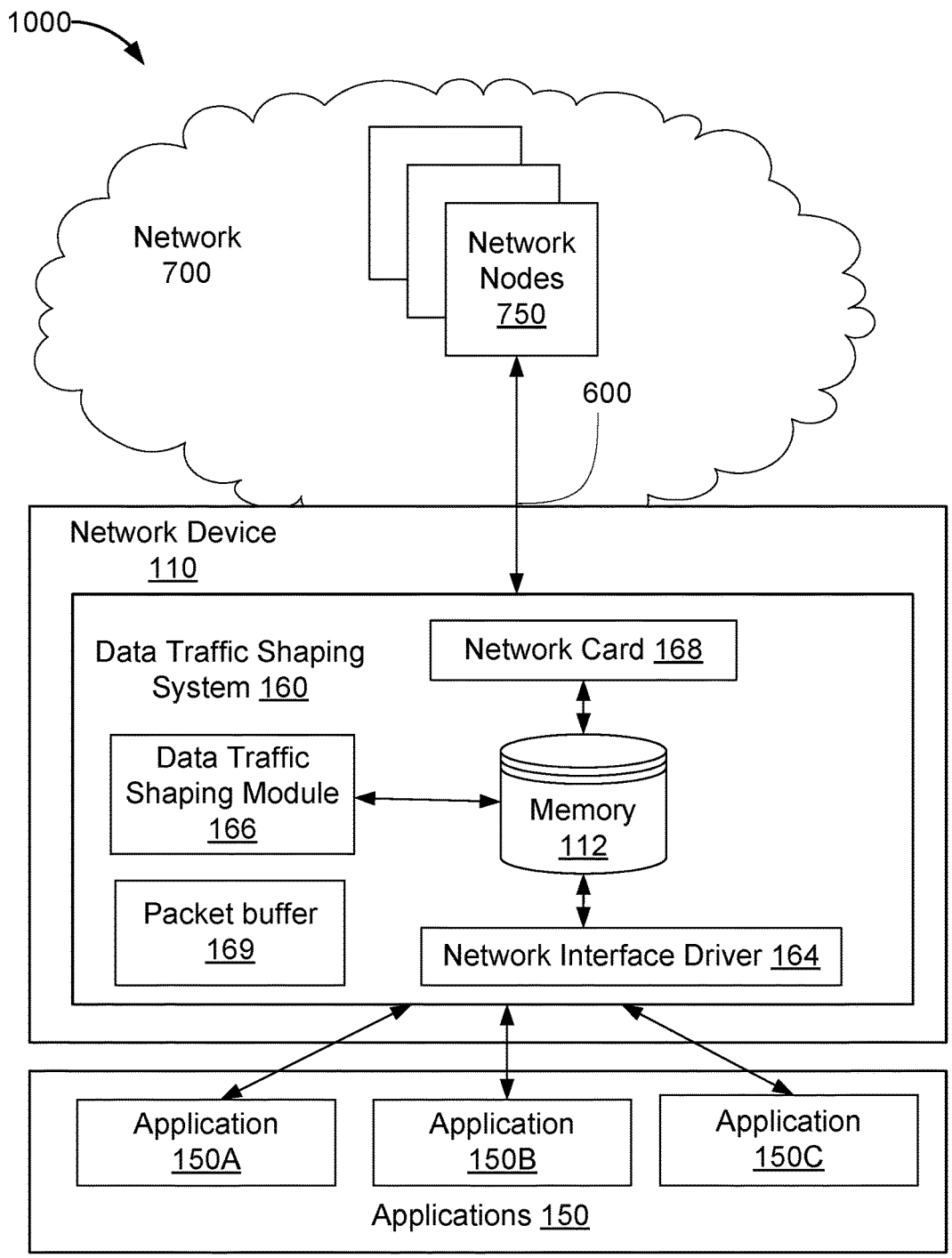
FIG. 1 is a block diagram of a network environment with a data traffic shaping system according to some implementations.

Presented are systems and methods related to traffic shaping in a network device. In some implementations, the systems and methods include a network interface driver of the network device configured to store descriptors associated with received packets in a transmission queue and transfer the descriptors to a traffic shaping module. The received packets originate from applications executing on a computing device, for example on one or more virtual machines hosted by the computing device. The guest operating systems of the virtual machines prevent the applications from forwarding additional packets to the network interface driver until a message is received confirming the previously forwarded packets have successfully been transmitted. As described herein, in some implementations, in response to determining that a first packet of the received packets has been successfully transmitted by a network card, the network interface driver communicates a packet transmission completion message to a software application or a guest operating system that has awaited receipt of a packet transmission completion message before forwarding additional data packets to the network interface driver. In some implementations, in response to determining that transmission by the network card of one of the received packets is to be delayed, the traffic shaping module removes a descriptor associated with the packet from the transmission queue and stores its descriptor in a corresponding traffic shaping queue. This configuration can be implemented with a single primary transmission queue in the network interface driver and multiple traffic shaping queues (for example, in a network interface card) employing different traffic shaping rules, thus allowing for per-flow traffic shaping without the need for multiple transmission queues in the network interface driver. Furthermore, with this configuration, packet sources, such as software applications running on a real OS of the network device (as opposed to on a guest OS of a virtual machine), or software applications or an upper layer of a TCP stack in a guest OS managed by a hypervisor, need not to be aware of the traffic shaping algorithms implemented in a network interface driver or on a network card. Therefore, costs in implementing network interface drivers and guest operating systems in a virtual machine environments can be reduced. Moreover, with this configuration, packet sources need not be aware of not only traffic shaping algorithms but also other configurations, e.g., packet classification rules and other traffic regulating policies. Therefore, the overall traffic shaping system can be more reliable than a system in which an application or user can configure such detailed rules and policies (e.g., the number of queues).

In conventional systems, packets are processed in order from a transmission queue, e.g., a first-in-first-out (FIFO) queue, and completions are returned in order. In some implementations in the present disclosure, a traffic shaping module can cause completion messages to be returned out of order by removing some data packets from the transmission queue for delayed transmission (without dropping). With this configuration of "out of order completion," because an application will not send more data packets until a completion message for data packets already forwarded to the network interface driver is received, the applicant can be caused to transmit data packets faster or slower, while still having a single transmission queue. That is, this configuration can avoid a head of line blocking by preventing a data packet to be delayed from remaining in the queue. Moreover, in some implementations, this "out of order" completion configuration can apply to individual flows (or streams) of data packets within an application, e.g., an application having thousands of connections open for corresponding flows or streams, so that each flow can be selectively slowed down.

Furthermore, in some implementations, the "out of order" completion configuration can exert "back pressure" to a sending module without head of line blocking, irrespective of how many primary transmission queues there are or how packets are put in each queue, as long as completion messages can be returned out of order. In some implementations, a traffic shaping mechanism with the "out of order" completion configuration can be implemented with specific network/hardware configurations (e.g., a specific number of primary transmission queues and specific queue assignment rules). For example, to shape a thousand flows/streams of traffic, a traffic shaping mechanism can be implemented with only a single queue or with a small number of queues (e.g., 16-32 queues). When implemented in a system having a small number of queues, a traffic shaping mechanism can return "out of order" completion messages whether each packet is put in a right queue based on predetermined queue assignment rules or packet traffic is "randomly" spread over the queues. For example, an "out of order" completion traffic shaping system for shaping packet traffic spread from a Linux system over a number of hardware queues can be implemented in a virtual machine without modification of network/hardware configurations (e.g., queue assignment rules of the Linux system or number of hardware queues). In some implementations, the traffic shaping system can provide such network/hardware compatibility by hiding the traffic shaping layer, flow classification rules and policies from an application or user.

FIG. 1 is a block diagram of an example network environment 1000 with a data traffic shaping system 160. In broad overview, the illustrated network environment includes a network 700 of interconnected network nodes 750. The network nodes 750 participate in the network 700 as data sources, data destinations (or data sinks), and intermediary nodes propagating data from sources towards destinations through the network 700. The network 700 includes the data traffic shaping system 160 of a network device 110 with links 600 to various other participating network nodes 750. Referring to FIG. 1 in more detail, the network 700 is a network facilitating interactions between participant devices. An illustrative example network 700 is the Internet; however, in other implementations, the network 700 may be another network, such as a local network within a data center, a network fabric, or any other local area or wide area network. The network 700 may be composed of multiple connected sub-networks or autonomous networks. The network 700 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. Any type and/or form of data network and/or communication network can be used for the network 700. It can be public, private, or a combination of public and private networks. In general, the network 700 is used to convey information between computing devices, e.g., network nodes 750, and the network device 110 of the data traffic shaping system facilitates this communication according to its configuration.

Figure 9:
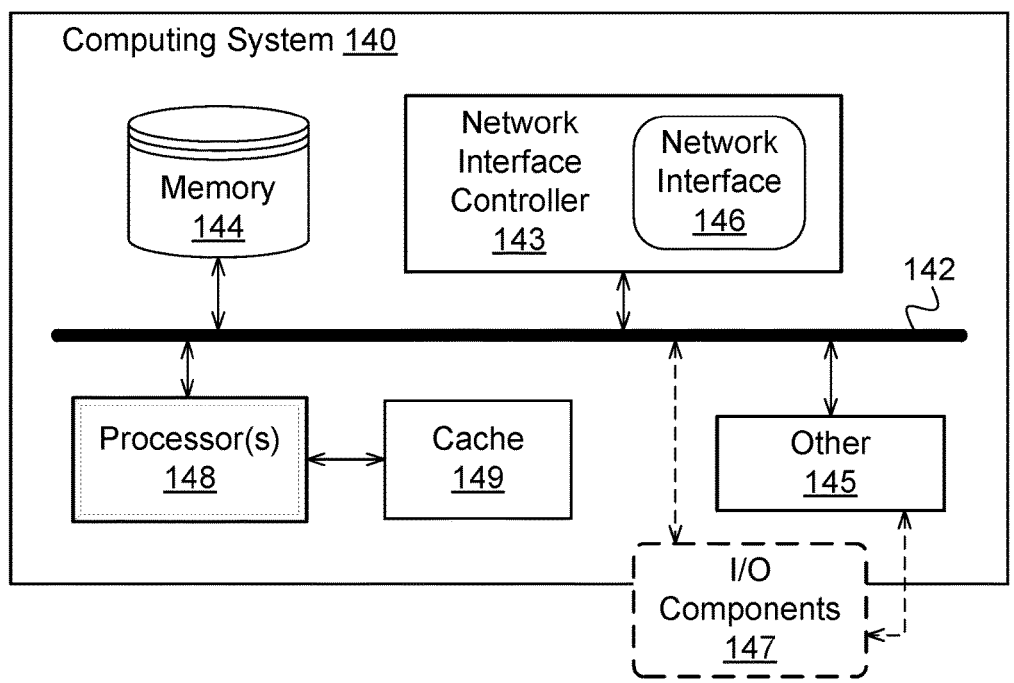
FIG. 9 is a block diagram of an example computing system.

Referring to FIG. 1, the network device 110 is a server hosting one or more virtual machines. The network device 110 includes the data traffic shaping system 160. In some implementations, the network device 110 includes a memory 112, and a network card 168. The network device 110 can include a packet buffer 169 for storing data packets. In some implementations, the network device 110 has configuration similar to that of a computing system 140 as shown in FIG. 9. For example, the memory 112 can have configuration similar to that of a memory 144 as shown in FIG. 9, and the network card 168 can have configuration similar to that of a network interface 146 or a network interface controller 143 as shown in FIG. 9. The computing system 140 is described in more detail below, in reference to FIG. 9. The elements shown in the computing system 140 illustrated in FIG. 9 do not all need to be present in some implementations of the network device 110 illustrated in FIG. 1. In some implementations, the network device 110 may be a software queue or an emulated network device, or software that acts as a network interface.

Referring again to FIG. 1, in some implementations, the data traffic shaping system 160 communicates with one or more applications 150 (for example applications 150A, 150B and 150C). One or more of the applications 150A-150C can be software applications running on a real operating system of the network device 110. In addition, one or more of the software applications 150A-150C can be a software application running on a guest OS managed by a hypervisor in a virtual machine environment, or an upper layer of a protocol stack (e.g., the TCP stack) of a guest OS of the virtual machine environment. For example, referring to FIG. 2, the applications 150A-150C can each be a software application 230 running on a real OS 220, a software application 265 running on a guest OS 260 managed by a hypervisor 250, or an upper layer of a protocol stack 261 of the guest OS 260 in FIG. 2. The hypervisor 250 and a virtual machine environment related thereto are described in more detail below in reference to FIG. 2.

Still referring to FIG. 1, in some implementations, the network device 110 includes a network interface driver 164 and a data traffic shaping module 166. The network interface driver 164 can be a network interface driver module running on a real OS. The network interface driver 164 can communicate with one of the software applications 150A-150C (e.g., the application 265 in FIG. 2) directly (if operating on the real OS of the network device 110), via a guest OS of a virtual machine (if operating in a virtual machine environment), or in some implementations, through a hypervisor and the guest OS. In some implementations, the network interface driver 164 is included within a first layer of a transmission control protocol (TCP) stack of the real OS of the network device 110 and communicates with a software module or application that is included in an upper layer of the TCP stack. In one example, the network interface driver 164 is included within a transport layer of a TCP stack and communicates with a software module or application that is included in an application layer of the TCP stack. In another example, the network interface driver 164 is included within a link layer of a TCP stack and communicates with a TCP/IP module that is included in an internet/transport layer of the TCP stack.

Referring again to FIG. 1, in some implementations, the data traffic shaping module 166 can be implemented as a portion of a network interface driver module running on a real OS. In some implementations, the data traffic shaping module 166 can be included as a portion of the network card 168.

Referring to FIG. 1, in some implementations, the packet buffer 169 can be located in a shared memory of the network device 110 so that some or all of the applications 150, the network card 168, network interface driver 164 and the data traffic shaping module 166 can directly or indirectly access the packet buffer 169. For example, the packet buffer 169 can be located in a shared memory accessible by a guest OS, the real OS, the network interface driver 164, and the network card 168. To send a packet over the network, prior to transmission to the network card 168, the data packet can be stored in the packet buffer 169 where it can be accessed the network interface driver 164 and the network card 168.

Figure 2:
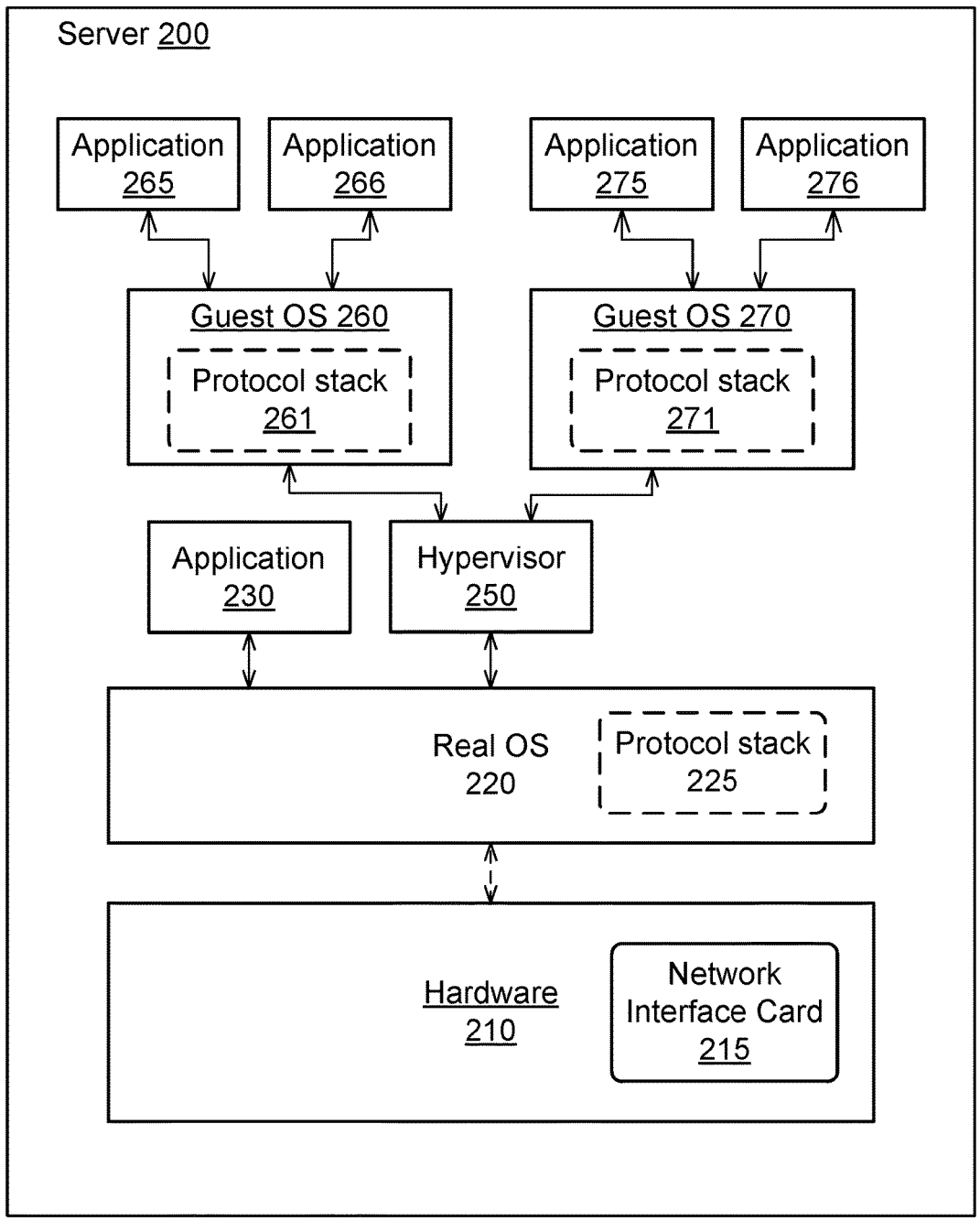
FIG. 2 is a block diagram of an example virtual machine environment.

FIG. 2 shows a block diagram of an example server 200 implementing a virtual machine environment. In some implementations, the server 200 includes hardware 210, a real operating system (OS) 220 running on the hardware 210, a hypervisor 250, two virtual machines having guest operating systems (guest OSs) 260 and 270. The hardware 210 can include, among other components, a network interface card (NIC) 215. The hardware 210 can have configuration similar to that of the computing system 140 as shown in FIG. 9. The NIC 215 of the hardware 210 can have configuration similar to that of the network interface controller 143 or the network interface 164 as shown in FIG. 9. In some implementations, the real OS 220 has a protocol stack 225 (e.g., TCP stack) and has a software application running on the real OS 220. In some implementations, the guest OSs 260 and 270 have protocol stacks 261 and 271, respectively. Each of the guest OSs 260 and 270 can host a variety of applications, e.g., software applications 265, 266, 275 and 276. The server 200 may be a file server, application server, web server, proxy server, appliance, network appliance, gateway, gateway server, virtualization server, deployment server, SSL VPN server, or firewall.

Referring again to FIG. 2, the server 200 executes the hypervisor 220, which instantiates and manages the first guest OS 260 and the second guest OS 270. The first guest OS 260 hosts a first software application 265 and a second software application 266. The second guest OS 260 hosts a third software application 275 and a fourth software application 276. For example, the applications can include database servers, data warehousing programs, stock market transaction software, online banking applications, content publishing and management systems, hosted video games, hosted desktops, e-mail servers, travel reservation systems, customer relationship management applications, inventory control management databases, and enterprise resource management systems. In some implementations, the guest OSs host other kinds of applications. The interactions between the components of the server 200 are described further in relation to FIGS. 3-6, below.

Figure 3:
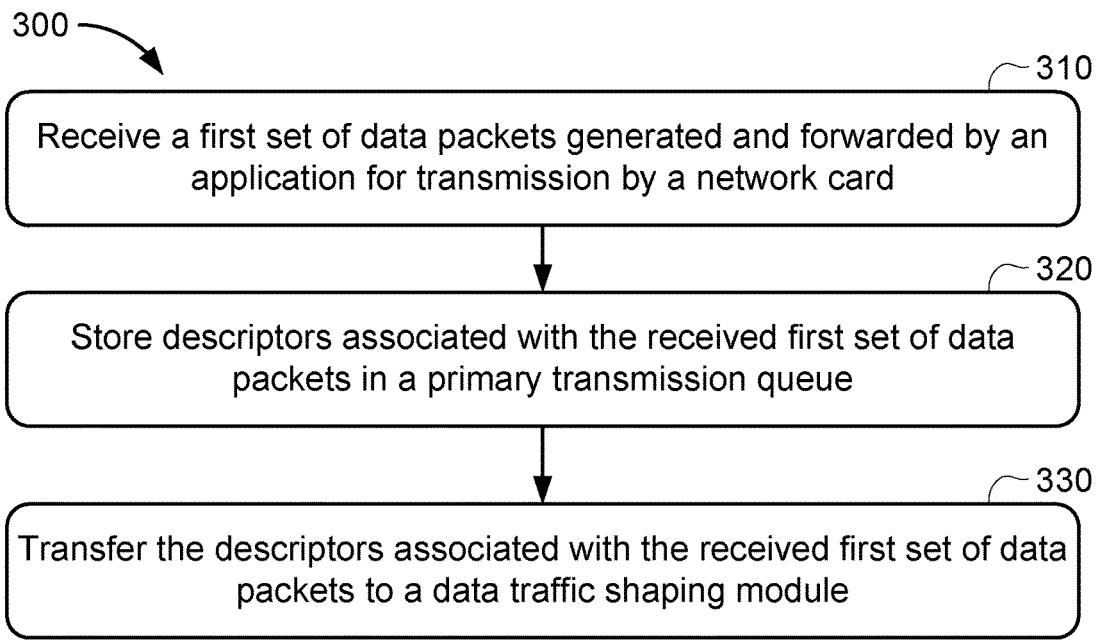
FIG. 3 is a flowchart showing operations of a network interface driver according to some implementations.

FIG. 3 is a flowchart for shaping network traffic using an example method 300 performed by a network interface driver, such as the network interface driver 164 shown in FIG. 1. In broad overview, the method 300 begins with stage 310, where a network interface driver can receive a first set of data packets generated and forwarded by an application for transmission by a network card, such as the network card 168 shown in FIG. 1. At stage 320, the network interface driver can store descriptors associated with the received first set of data packets in a primary transmission queue. At stage 330, the network interface driver can transfer the descriptors associated with the received first set of data packets to a data traffic shaping module, such as the data traffic shaping module 166 shown in FIG. 1.

Now, the flowchart in FIG. 3 will be described in more detail, referring to FIGS. 6A and 6B, which are block diagrams representing examples of operations of a data traffic shaping system according to some implementations.

At stage 310, the network interface driver can receive a first set of data packets generated and forwarded by an application for transmission by a network card. For example, referring to FIG. 6A, the network interface driver 164 receives a set of data packets generated and forwarded by one of a set of applications 150A-150C for transmission by the network card 168. In some implementations, in response to receiving the set of data packets, the network interface driver 164 stores the received set of data packets in a packet buffer (e.g., the packet buffer 169 in FIGS. 1 and 6A-6D). For example, the packet buffer 169, as a shared resource, can be located in a shared memory between a guest OS and the network interface driver 164 so that packets sent from an application 150 running on the guest OS can be stored in the packet buffer 169 and descriptors associated with the packets point to locations within the shared source. In some implementations, a descriptor that contains a pointer (e.g., memory address) to a particular packet in the packet buffer is associated with the particular packet. In some implementations, descriptors are generally small (e.g., 32 bytes or including a few 64 bits integers) and easy to handle while a packet is generally a few hundred bytes at minimum, and often 1500 bytes.

In some implementations, data packets can be parts of streams. The applications 150 can send data packets in each stream in a specific order. Each stream can come from a different application (e.g., applications executing on different guest OSs). In the example shown in FIG. 6A, the application 150A sends three packets of a first stream, in sequential order, corresponding to descriptors S1, S2 and S3. The application 150B sends, in sequential order, three packets of a second stream corresponding to descriptors T1, T2 and T3. The application 150C sends two packets of a third stream corresponding to descriptors U1 and U3.

At stage 320, the network interface driver can store descriptors associated with the received first set of data packets in a primary transmission queue 161. Referring to FIGS. 6A-6D, the network device 110 includes a primary transmission queue 161 for containing descriptors associated with data packets received from the applications 150. In some implementations, the primary transmission queue 161 is a single queue. In some implementations, the primary transmission queue 161 can be either a hardware queue (e.g., queues implemented in dedicated hardware) or a software queue. In some implementations, the primary transmission queue 161 is a set of primary transmission queues. For example, the primary transmission queue 161 is multiple queues implemented in multi-queue NICs. In some implementations, the number of the set of primary transmission queues is smaller than the number of rate limiters (e.g., traffic shaping queues). For example, to shape thousands of flows or streams, the network device 110 can have about 10- about 32 hardware queues, while having many more traffic shaping queues installed therein to shape the thousands of flows. In response to receiving data packets from the applications 150, the network interface driver 164 writes descriptors associated with the data packets in a single queue, e.g., the primary transmission queue 161. In some implementations, the network interface driver 164 writes descriptors associated with the data packets in each stream in the primary transmission queue 161 in the order the packets were sent by the applications 150. For example, as shown in FIG. 6A, the network interface driver 164 receives eight data packets from the applications 150 and writes descriptors associated with the packets (e.g., descriptors T1, U1, T2, S1, U2, S2, S3, T3) in the primary transmission queue 161 for transmission of the packets via the network card 168. In some implementations, in response to receiving data packets from the applications 150, the network interface driver 164 can write the received packets (instead of storing descriptors associated with them) in a single transmission queue.

The network interface driver 164 receives the packets of the first stream from the application 150A and writes the descriptors S1, S2 and S3 in the primary transmission queue 161 in the order they were transmitted, i.e., S1, followed by S2, followed by S3. Similarly, the network interface driver 164 receives the packets of the second stream from the application 150B and writes the descriptors T1, T2 and T3 in the order they were received in the primary transmission queue 161, and the network interface driver 164 receives the packets of the third stream from the application 150C and writes the descriptors U1 and U2 in the primary transmission queue 161. In some implementations, in the primary transmission queue, packets of different streams can be interleaved while maintaining a reception order of packets in each stream. For example, in the example shown in FIG. 6A, in the primary transmission queue, packets of different streams are interleaved (i.e., in the order of T1, U1, T2, S1, U2, S2, S3, and T3) while maintaining a reception order of the packets of each stream (e.g., maintaining the order of S1->S2->S3 for the first stream, the order of T1->T2->T3 for the second stream, and the order of U1->U2 for the third stream).

At stage 330, the network interface driver can transfer the descriptors associated with the received first set of data packets to a data traffic shaping module. For example, referring to FIG. 6B, in some implementations, the network interface driver 164 transfers the descriptors associated with the received data packets (e.g., T1, U1, T2, S1, U2, S2, S3, and T3) to the data traffic shaping module 166.

Figure 4:
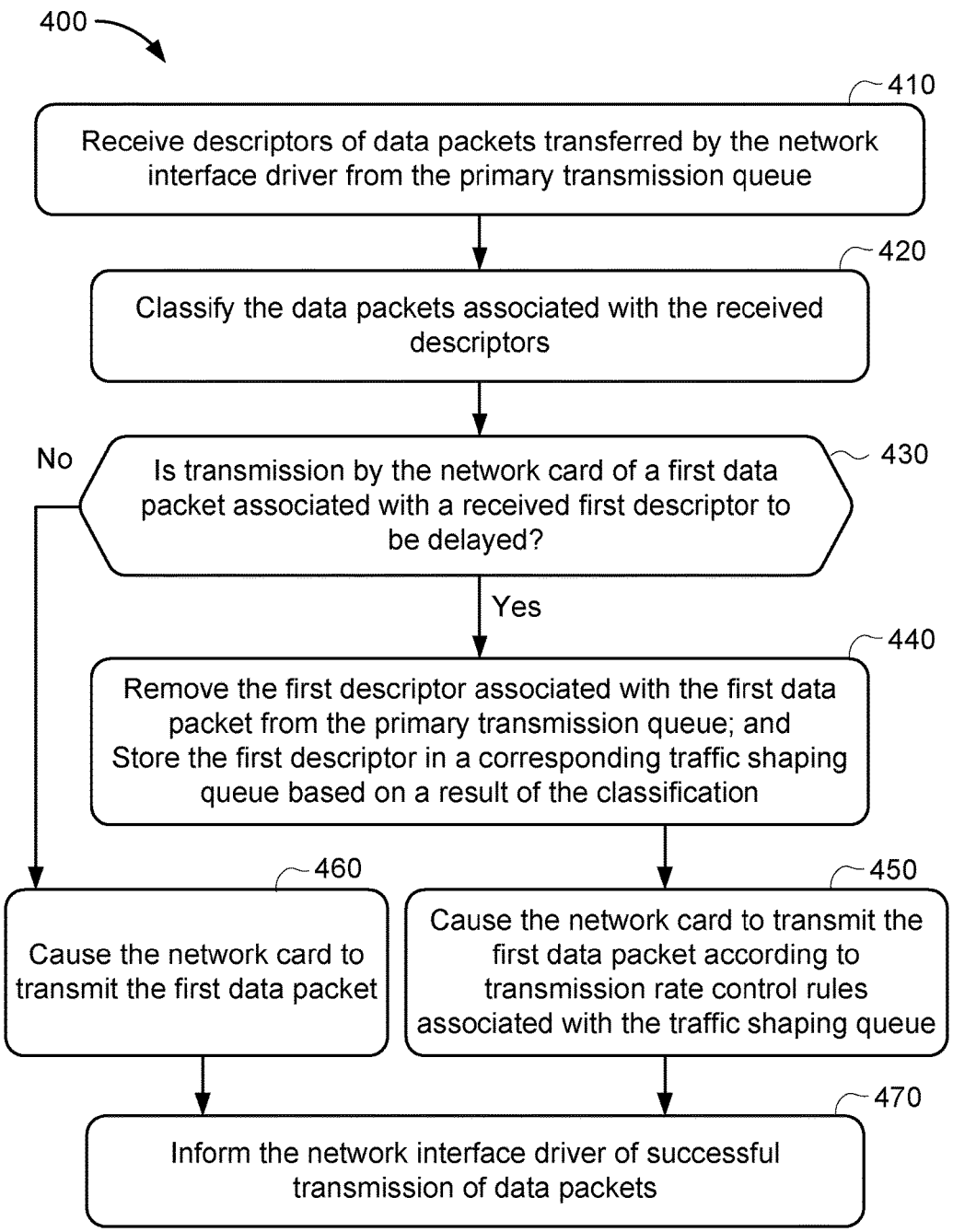
FIG. 4 is a flowchart showing operations of a data shaping module according to some implementations.

FIG. 4 is a flowchart for shaping network traffic using an example method 400 performed by a data traffic shaping module, such as the data shaping module 166 shown in FIG. 1 and FIGS. 6A-6D. In broad overview, the method 400 begins with stage 410 in which the data traffic shaping module maintains a plurality of traffic shaping queues and receives the descriptors of data packets transferred by a network interface driver, such as the network interface driver 164 shown in FIG. 1 and FIGS. 6A-6D, from a primary transmission queue. At stage 420, the data traffic shaping module classifies the data packets associated with the received descriptors. At stage 430, the data traffic shaping module determines whether transmission by a network card, such as the network card 168 shown in FIG. 1 and FIGS. 6A-6D, of a first data packet associated with a received first descriptor is to be delayed. At stage 440, if the data traffic shaping module determines that transmission by the network card of a first data packet associated with a received first descriptor is to be delayed, the data traffic shaping module removes the first descriptor associated with the first data packet from the primary transmission queue and stores the first descriptor in a corresponding traffic shaping queue based on a result of the classification. Then, at stage 450, the data traffic shaping module causes the network card to transmit the data packets associated with descriptors stored in the traffic shaping queues according to transmission rate rules associated with the respective traffic shaping queues. At stage 460, if the data traffic shaping module determines that transmission by the network card of a first data packet associated with a received first descriptor is not to be delayed, the data traffic shaping module causes the network card to immediately transmit the first data packet. At stage 470, the data traffic shaping module informs the network interface driver of successful transmission of data packets. Note as used herein, successful transmission of a data packet does not necessarily require successful receipt of the data packet by a recipient. That is, receipt of an acknowledgement of packet receipt (e.g., a TCP ACK message) is not a prerequisite for the network interface card to determine that a packet has been successfully transmitted.

Now, the flowchart in FIG. 4 will be described in more detail, by referring to FIGS. 6A-6D, which are block diagrams representing example operations of a data traffic shaping system according to some implementations.

As set forth above, at stage 410, the data traffic shaping module maintains a plurality of traffic shaping queues and receives the descriptors of data packets transferred by the network interface driver from a primary transmission queue.

Figure 6A:
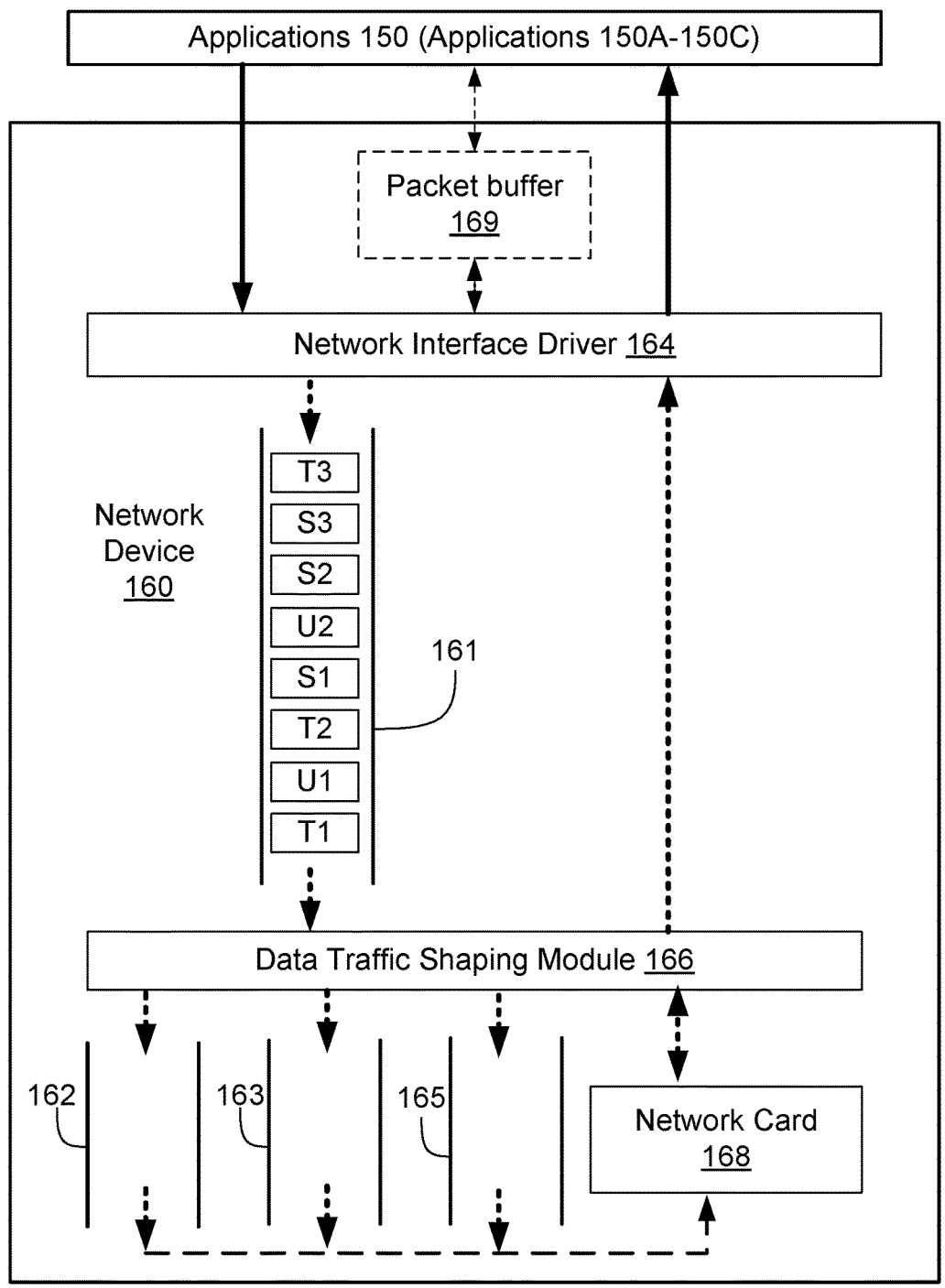
FIGS. 6A-6D are block diagrams representing examples of operations of a data traffic shaping system according to some implementations.
Figure 6B:
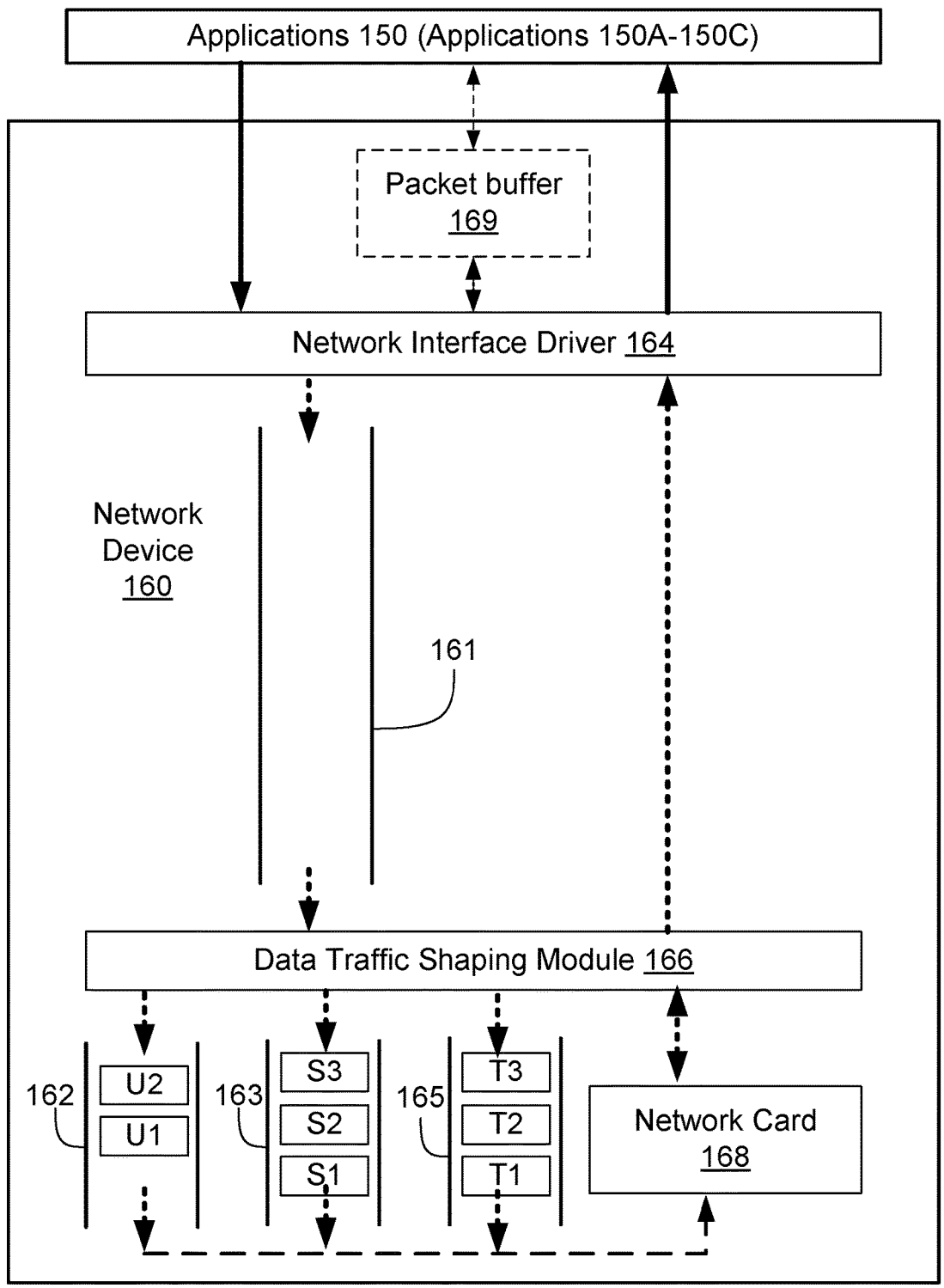

For example, referring to FIGS. 6A-6D, the data traffic shaping module 166 maintains a plurality of traffic shaping queues (e.g., traffic shaping queues 162, 163 and 165). In some implementations, each traffic shaping queue can maintain a corresponding packet buffer (not shown) for storage of packets to be managed by traffic shaping queue. In some implementations, at least some of the traffic shaping queues share access to the packet buffer 169 and thus need not have their own separate packet buffers. Referring to FIGS. 6A and 6B, in response to the network interface driver 164 transferring descriptors associated with received data packets to the data traffic shaping module 166 (e.g., T1, U1, T2, S1, U2, S2, S3, and T3), the data traffic shaping module 166 receives the transferred descriptors of the data packets from the primary transmission queue 161.

At stage 420, the data traffic shaping module classifies the data packets associated with the received descriptors. In some implementations, for example as shown in FIG. 6B, the data traffic shaping module 166 classifies the data packets associated with the received descriptors based on a set of classification rules for mapping characteristics of each stream to a corresponding traffic shaping queue. For example, the traffic shaping module can classify packets based on a four-tuple or a five-tuple of data in the packet header, including four or five of source and destination IP addresses, source and destination port numbers, and a type of service indicator. In some implementations, packets can be classified more broadly using header fewer data fields. For example, in some implementations, packets may be classified based on a single data field, such as a type of service (ToS) or quality of service (QoS) field (depending on the protocol and protocol version being used), a file type field, or a port number, each of which can often be correlated to priority levels. After identifying the relevant characteristics of the packet, the data traffic shaping module 166 compares the identified characteristics with the classification rules and assigns the packet to the traffic shaping queue whose classification rule has been met. In some implementations, the traffic shaping module 166 maintains a "catch-all" traffic shaping queue for handling all packets that do not get assigned to other traffic shaping queues based on their specific characteristics.

In some implementations, each traffic shaping queue has at least one associated transmission rate rule. The transmission rate rules for a particular traffic queue can specify a flow rate limit for transmitting packets stored in the particular traffic queue by the network card. Referring to FIGS. 6A-6D, the data traffic shaping module 166 can cause the network card 168 to transmit the packets stored in the particular traffic shaping queue according to the transmission rate rules for the queue. In some implementations, transmission rate rules can be either absolute or conditional. Similarly, the transmission rate rules can be based on numbers of packets or amounts of data. Some example absolute transmission rate rules include 1) unlimited transmission; 2) maximum number of packets transmitted per second; 3) average number of packets transmitted per second; 4) maximum bits transmitted per second; or 5) average bits transmitted per second. In some implementations, the transmission rate rules can include combinations of the any of above types of rules. For example, a transmission rate rule may specify an average allowable bits or packets per second along with a maximum number of bits or packets per second to allow for and/or accommodate burstiness of traffic. Conditional transmission rate rules allow for different absolute transmission rate rules in different circumstances. For example, a conditional transmission rate rule might permit one transmission rate in circumstances in which a different traffic shaping queue is empty than when that different traffic shaping queue is full. Another conditional transmission rule might permit different transmission rates depending on the number of packets in the queue, for example to allow for quicker processing of packets in circumstances in which the queue is becoming undesirably full. The above rules are examples of a wide range of rules that may be implemented for each of the respective traffic shaping queues. The specific rules can be set, for example, by a system administrator.

At stage 430, the data traffic shaping module can determine whether transmission by the network card of a first data packet associated with a received first descriptor is to be delayed. Transmission of a packet is delayed if its classification results in its being assigned to a traffic shaping queue already storing unsent packets (or descriptors thereof).

At stage 440, if the data traffic shaping module determines that transmission by the network card of a first data packet associated with a received first descriptor is to be delayed, the data traffic shaping module removes the first descriptor associated with the first data packet from the primary transmission queue and stores the first descriptor in a corresponding traffic shaping queue based on a result of the classification. For example, referring to FIGS. 6A and 6B, in response to determination that transmission by the network card 168 of the data packet associated with the descriptor T1 of the second stream is to be delayed, the data traffic shaping module 166 removes the descriptor T1 from the primary transmission queue 161 and stores the descriptor T1 in the traffic shaping queue 165. Similarly, the data traffic shaping module 166 removes the descriptors T2 and T3 of the second stream from the primary transmission queue 161 and stores the descriptors T2 and T3 in the traffic shaping queue 165. In response to determination that transmission by the network card 168 of the data packet associated with the descriptor S1 of the first stream is to be delayed, the data traffic shaping module 166 removes the descriptor S1 from the primary transmission queue 161 and stores the descriptor S1 in the traffic shaping queue 163. Similarly, the data traffic shaping module 166 removes the descriptors S2 and S3 of the first stream from the primary transmission queue 161 and stores the descriptors S2 and S3 in the traffic shaping queue 163.

The removal of descriptors associated with a traffic stream that is determined to be delayed, from a single transmission queue, can resolve a queuing problem referred to as "head-of-line blocking." If transmission of a packet at the head of a first in first out (FIFO) queue is delayed, but remains in the transmission queue, the packet will block processing of all other packets associated with the descriptors stored behind it in the queue (including packets that would not otherwise be delayed based on the traffic shaping rules implemented by the traffic shaping module), causing the "head-of-line blocking" problem. In contrast, for data packets whose transmission is determined to be delayed based on traffic shaping rules, the data traffic shaping module 166 can transfer the descriptor associated with the packet from the head of the transmission queue. This removal can allow for continued processing of other packets associated with the descriptors stored in the queue, thereby resolving the "head-of-line blocking" problem. Furthermore, in response to the removal of the descriptor from the transmission queue, the data traffic shaping module 166 can move the descriptor to a corresponding traffic shaping queue, thereby allowing for a delayed transmission of the packet without dropping the descriptor or its corresponding packet.

Referring again to FIG. 6B, in some implementations, if the data traffic shaping module 166 determines that transmission by the network card 168 of a data packet in a first stream (e.g., the data packet corresponding to the descriptor S1) is to be delayed, the data traffic shaping module 166 stores the descriptor associated with the data packet in the first stream in a first traffic shaping queue (e.g., the traffic shaping queue 163). If the data traffic shaping module 166 determines that transmission by the network card of a data packet in a second stream (e.g., the data packet corresponding to the descriptor T1), different from the first stream, is to be delayed, the data traffic shaping module 166 stores the descriptor associated with the data packet in the second stream in a second traffic shaping queue (e.g., the traffic shaping queue 165). In some implementations, packets associated with different streams can be transferred to the same traffic shaping queue. That is, the traffic shaping module 166 can maintain fewer, and in many cases, far fewer traffic shaping queues than the number of streams handled by the traffic shaping module 166.

At stage 450, the data traffic shaping module causes the network card to transmit the data packets associated with descriptors stored in the traffic shaping queues according to transmission rate rules associated with the respective traffic shaping queues. For example, referring to FIGS. 6B-6D, the data traffic shaping module 166 causes the network card 168 to transmit the data packets associated with the descriptors S1, S2 and S3 stored in the traffic shaping queue 163 in a delayed manner according to the transmission rate rules associated with the traffic shaping queue 163. The data traffic shaping module 166 also can cause the network card 168 to transmit the data packets associated with the descriptors T1, T2 and T3 stored in the traffic shaping queue 165 in a delayed manner according to the transmission rate rules associated with the traffic shaping queue 165.

At stage 460, if the data traffic shaping module determines that transmission by the network card of a first data packet associated with a received first descriptor is not to be delayed, the data traffic shaping module can cause the network card to immediately transmit the data packets associated with descriptors stored in the traffic shaping queues. For example, if a data packet is classified such that it is assigned to a traffic shaping queue having a transmission rate rule allowing for an unlimited transmission rate and the queue is empty, the data packet may be transmitted immediately without delay. Packets associated with the descriptors U1 and U2 are treated as such in the example shown in FIGS. 6A-6D. Similarly, a packet may be transmitted immediately if it is classified into a traffic shaping queue that is empty and which has not exceeded the transmission rate identified in its corresponding transmission rate rule.

In some implementations, the network card 168 transmits a data packet by using a resource. In some implementations, the resource is a memory buffer (e.g., the packet buffer 169 in FIGS. 1 and 6A-6D) shared by some or all of the applications 150, the network interface driver 164 and the network card 168. For example, the network card 168 identifies an address of the data packet in the packet buffer 169 (in a shared memory) using a descriptor associated with the data packet, and then transmits the data packet from the packet buffer 169. In some implementations, in response to transmitting a data packet using the packet buffer 169, the network card 168 can cause the packet buffer to release the memory space used to store the transmitted packet such that the space can be used to store new packets.

At stage 470, the data traffic shaping module can inform the network interface driver of successful transmission of data packets. For example, referring to FIG. 6C, in response to a successful completion of the (immediate) transmission of the data packets associated with the descriptors U1 and U2 via the network card 168, the data traffic shaping module 166 informs the network interface driver 164 of the successful transmission of the data packets. In some implementations, the data traffic shaping module 166 can inform the network interface driver 164 of the successful transmission of the data packets by forwarding, to the network interface driver 164, a single message generated by the network card 168 indicating the successful transmission of the data packets associated with the descriptors U1 and U2. In some implementations, the data traffic shaping module 166 can separately inform the network interface driver 164 of the successful transmission of each of the data packets associated with the descriptors U1 and U2 by forwarding separate transmission completion messages to the network interface driver 164 for each packet.

Similar communications can be generated and forwarded for delayed transmissions. For example, referring to FIG. 6D, in response to a successful completion of the (delayed) transmission of the data packets associated with the descriptors T1, S1, T2, S2, T3 and S3 via the network card 168, the data traffic shaping module 166 informs the network interface driver 164 of the successful transmission of the data packets. In some implementations, the data traffic shaping module 166 can inform the network interface driver 164 of the successful transmission of the data packets by forwarding, to the network interface driver 164, a single message generated by the network card 168 indicating the successful transmission of multiple data packets. In some implementations, the data traffic shaping module 166 can separately inform the network interface driver 164 of the successful transmission of each individual data packet.

Figure 5:
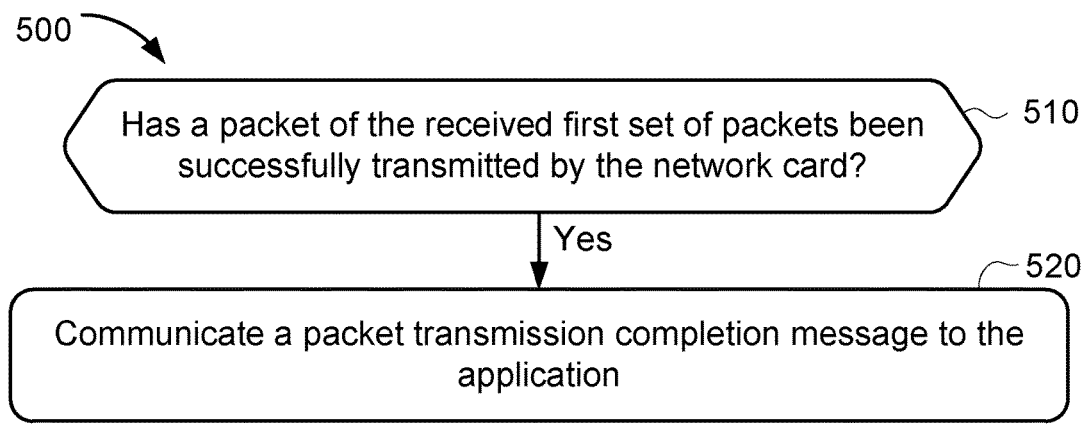
FIG. 5 is a flowchart showing operations of a network interface driver according to some implementations.

FIG. 5 is a flowchart for shaping network traffic using an example method 500 performed by a network interface driver. In broad overview, the method 500 begins with stage 510, where network interface driver, such as the network interface driver 164 shown in FIGS. 1 and 6A-6D, determines whether a packet of the received first set of packets has been successfully transmitted by a network card, such as the network card 168. At stage 520, if the network interface driver determines that a packet of the first set of received packets has been successfully transmitted, the network interface driver communicates a packet transmission completion message to the application that has awaited receipt of a packet transmission completion message from the network interface driver before forwarding additional data packets to the network interface driver.

The method shown in the flowchart of FIG. 5 is described in more detail below with reference to FIGS. 6A-6D.

Referring to FIG. 5 in more detail, at stage 510, the network interface driver determines whether a packet of the received first set of packets has been successfully transmitted by the network card. For example, referring to FIG. 6C, in response to a successful completion of the transmission of the data packets associated with the descriptors U1 and U2 by the network card 168, the data traffic shaping module 166 informs the network interface driver 164 of the successful transmission of the data packets by communicating a single message or multiple messages. Based on notification of a successful transmission of data packets from the data traffic shaping module 166, the network interface driver 164 determines that each packet of the received packets has been successfully transmitted by the network card 168.

At stage 520, in response to the network interface driver determining that a packet of the received first set of packets has been successfully transmitted, the network interface driver communicates a packet transmission completion message to the application that has awaited receipt of a packet transmission completion message from the network interface driver before forwarding additional data packets to the network interface driver. For example, referring to FIG. 6C, in response to determination that the packet associated with the descriptor U1 of the third stream originally sent from the application 150C has been successfully transmitted by the network card 168, the network interface driver 164 communicates a packet transmission completion message 167 corresponding to the descriptor U1 (e.g., M-U1 in FIG. 6C) to the application 150C. Similarly, in response to determination that the packet associated with the descriptor U2 of the third stream originally sent from the application 150C has been successfully transmitted by the network card 168, the network interface driver 164 communicates a packet transmission completion message 167 corresponding to the descriptor U2 (e.g., M-U2 in FIG. 6C) to the application 150C. In some implementations, transmission messages 167 can be small (e.g., 32 bytes or including a few 64 bit integers). In some implementations, in response to receiving a single message (not shown) from the data traffic shaping module 166 indicating the successful transmission of the data packets associated with the descriptors U1 and U2, the network interface driver 164 generates two separate transmission completion messages (e.g., M-U1 and M-U2 in FIG. 6C) and communicates each message to a corresponding packet source, e.g., the application 150C in the order of the successful transmission of the data packets. In some implementations, in response to receiving from the data traffic shaping module 166 message (not shown) indicating the successful transmission of each of the data packets associated with the descriptors U1 and U2, the network interface driver 164 can forward the received message as a transmission completion message to a corresponding packet source, e.g., the application 150C.

Figure 6C:
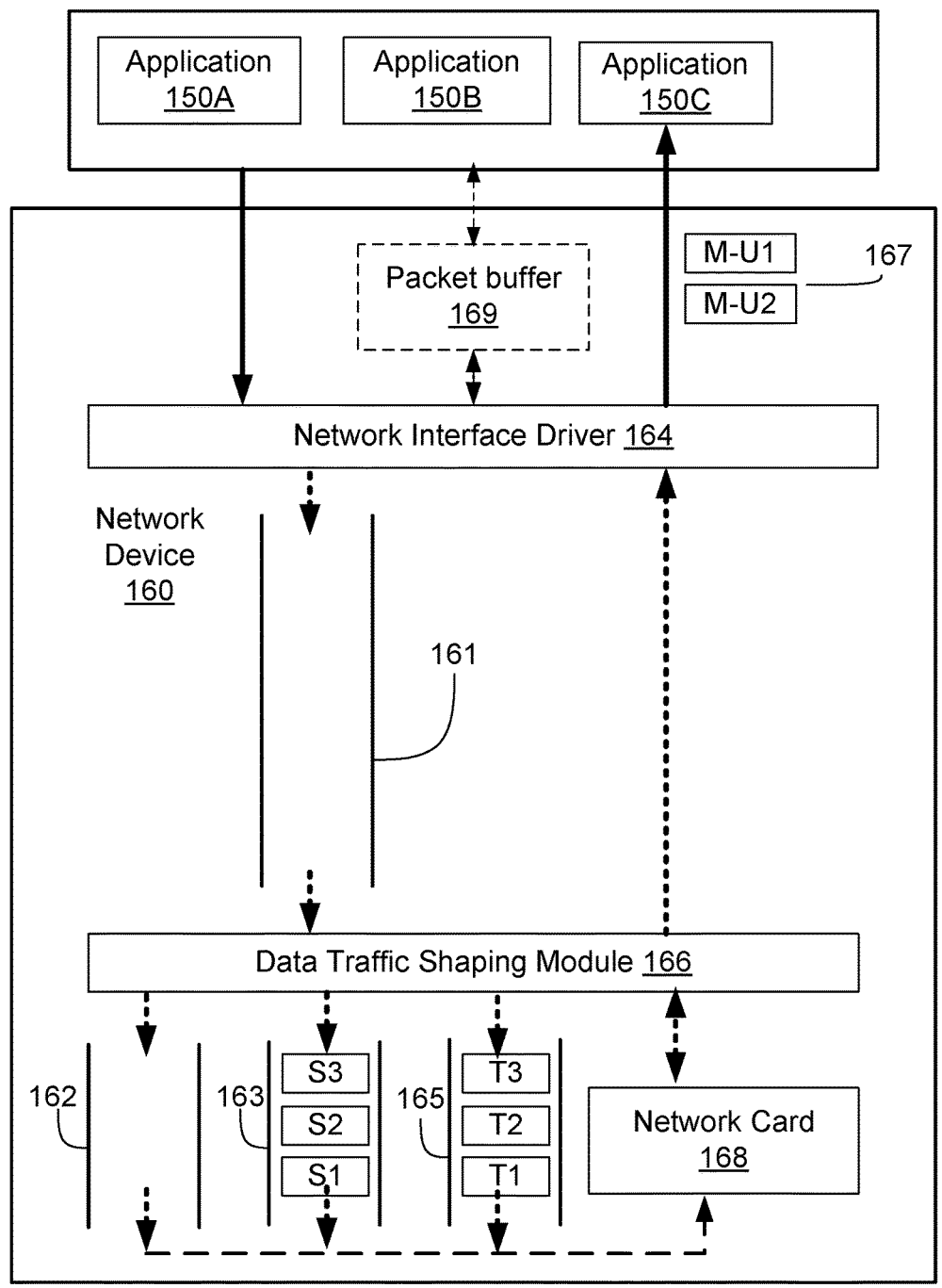
Figure 6D:
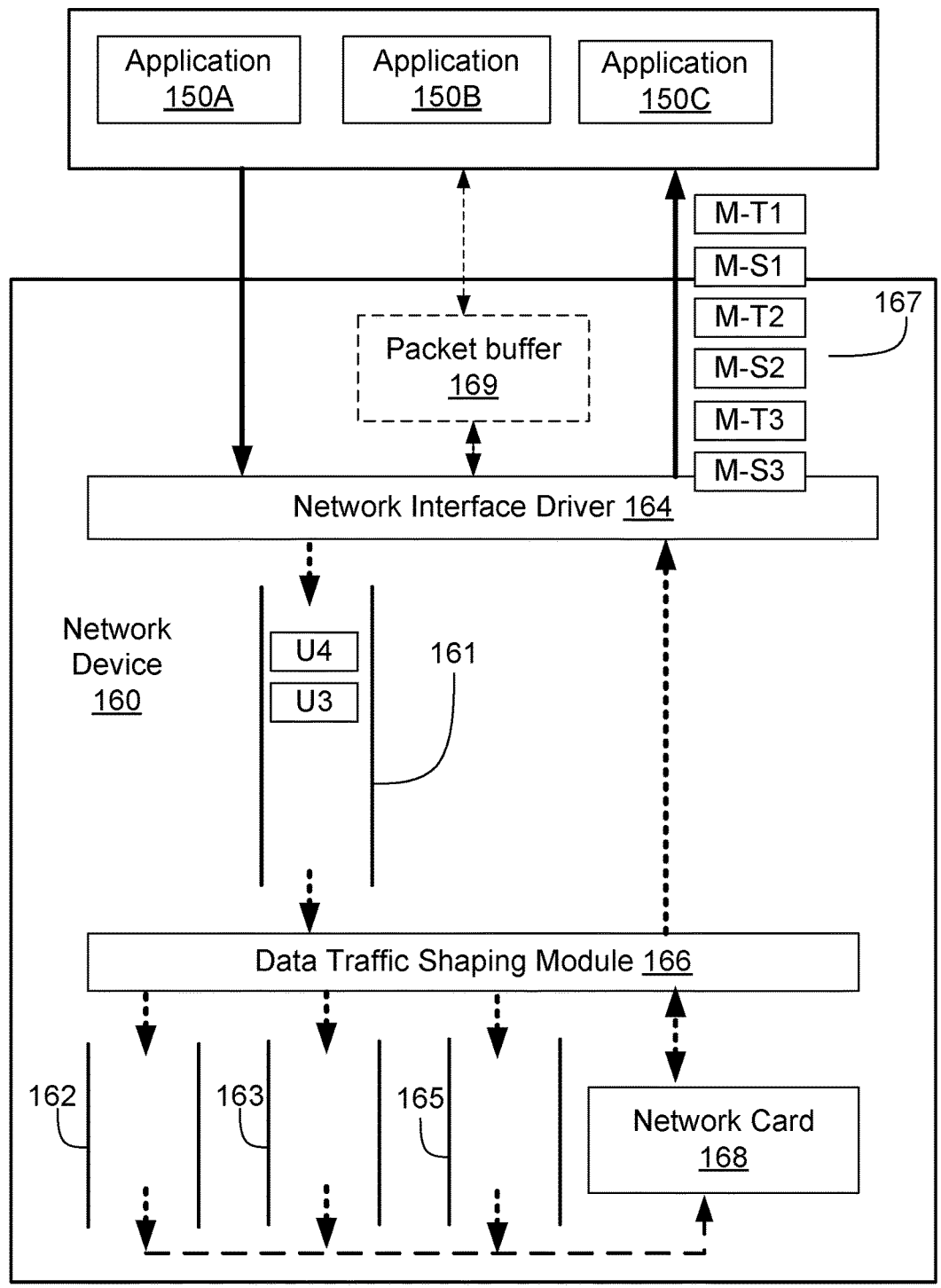

Referring to FIG. 6D, in response to a determination that the packet associated with the descriptor T1 of the second stream originally sent from the application 150B has been successfully transmitted by the network card 168, the network interface driver 164 communicates a packet transmission completion message 167 corresponding to the descriptor T1 (e.g., M-T1 in FIG. 6D) to the application 150B. Similarly, in response to determination that the packet associated with the descriptor S1 of the first stream originally sent from the application 150A has been successfully transmitted by the network card 168, the network interface driver 164 communicates a packet transmission completion message 167 corresponding to the descriptor S1 (e.g., M-S1 in FIG. 6D) to the application 150B. In some implementations, in response to receiving, from the data traffic shaping module 166, a single message (not shown) indicating the successful transmission of the data packets associated with the descriptors T1, S1, T2, S2, T3 and S3, the network interface driver 164 can generate six separate transmission completion messages (e.g., M-T1, M-S1, M-T2, M-S2, M-T3 and M-S3 in FIG. 6C) and communicate each message to a corresponding packet source (e.g., the application 150A for the descriptors T1, T2, T3 of the first stream, and the application 150B for the descriptors S1, S2, S3 of the second stream) in the order of the successful transmission of the data packets (e.g., in the order of T1, S1, T2, S2, T3 and S3). Or just one message to each source (e.g., one message to the application 150A and one message to the application 150B) can be sent as each message is received from the data traffic shaping module 166, with the each message identifying multiple successfully transmitted packets.

In some implementations, each of the applications 150 can be configured to await receipt of a packet transmission completion message from the network interface driver 164 before forwarding additional data packets to the network interface driver 164. In some implementations, each of the applications 150 can be configured to await receipt of a transmission completion message for a data packet of a particular stream from the network interface driver 164 before forwarding additional data packets of the same stream to the network interface driver 164. For example, as shown in FIG. 6C, the application 150C awaits receipt of a transmission completion message for a data packet of the third stream corresponding to the descriptor U1 from the network interface driver 164. Referring to FIG. 6D, in response to receiving by the application 150C the transmission completion message corresponding to the descriptor U1, the application 150C forwards additional data packets of the same third stream (e.g., data packets corresponding to descriptors U3 and U4 as shown in FIG. 6D) to the network interface driver 164. In this manner, the application 150C can maintain, in the primary transmission queue, a small number of packets (e.g., 1 or 2 or 3 packets) per stream by sending additional packets to the network interface driver 164 only when it receives a packet transmission completion message that a packet of the same stream has been transmitted by the network card 168. In some implementations, in response to receiving a transmission completion message corresponding to a descriptor of a particular stream, an application can forward additional data packets of a stream different from the particular stream to the network interface driver 164.

The methods shown in the flowcharts of FIGS. 3-5 are also described below with reference to FIGS. 7A-7D, which are block diagrams representing examples of operations of a data traffic shaping system according to some implementations. In FIGS. 7A-7D, the same reference numbers as FIGS. 6A-6D are used, with like descriptions omitted. FIGS. 7A-7D shows operations of a data traffic shaping system when a single application 150D sends packets of different streams or flows (e.g., packets of a fourth stream corresponding to descriptors V1, V2, V3, and packets of a fifth stream corresponding to descriptors W1, W2, W3) to the network interface driver 164.

At stage 310 in FIG. 3, the network interface driver can receive a first set of data packets generated and forwarded by an application for transmission by a network card. For example, referring to FIG. 7A, the network interface driver 164 receives a set of data packets generated and forwarded by an application 150D for transmission by the network card 168. In the example shown in FIG. 7A, the application 150D sends three packets of the fourth stream, in sequential order, corresponding to descriptors V1, V2 and V3. The same application 150D sends, in sequential order, three packets of the fifth stream corresponding to descriptors W1, W2 and W3.

Figure 7A:
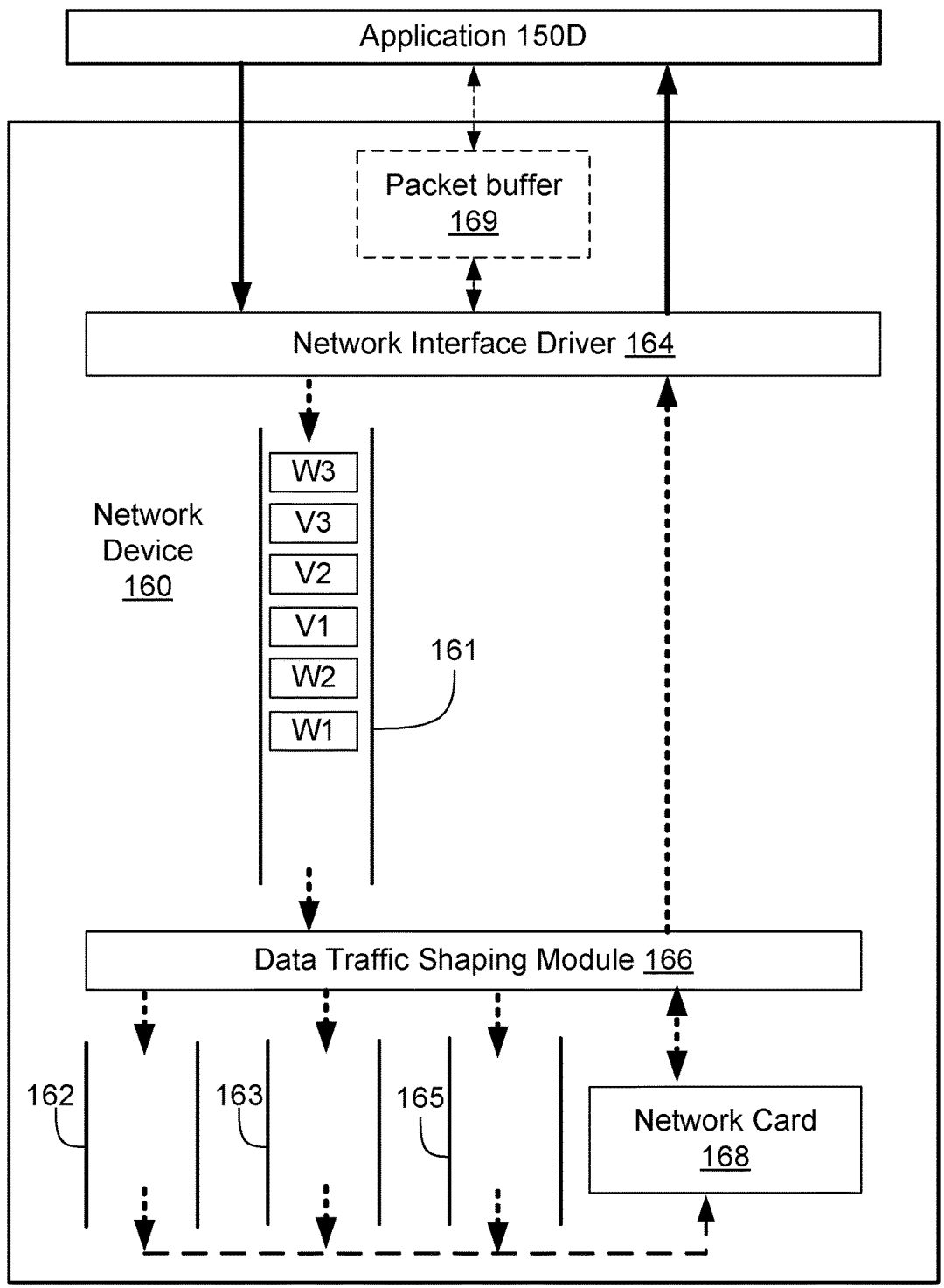
FIGS. 7A-7D are block diagrams representing examples of operations of a data traffic shaping system according to some implementations.

At stage 320 in FIG. 3, the network interface driver can store descriptors associated with the received first set of data packets in the primary transmission queue 161. In some implementations, the network interface driver 164 writes descriptors associated with the data packets from each stream in the primary transmission queue 161 in the order the packets were sent by the application 150D. For example, as shown in FIG. 7A, the network interface driver 164 receives six data packets from the application 150D and writes descriptors associated with the packets (e.g., descriptors W1, W2, V1, V2, V3, W3) in the primary transmission queue 161 for transmission of the packets via the network card 168. The network interface driver 164 receives the packets of the fourth and fifth streams from the application 150D and writes the corresponding descriptors (e.g., V1, V2, V3 for the fourth stream and W1, W2, W3 for the fifth stream) in the primary transmission queue 161 in the order they were transmitted, i.e., W1, followed by W2, followed by V1, followed by V2, followed by V3, followed by W3. In some implementations, in the primary transmission queue, packets of different streams can be interleaved while maintaining a reception order of packets in each stream. For example, in the example shown in FIG. 7A, in the primary transmission queue, packets of different streams are interleaved (i.e., in the order of W1, W2, V1, V2, V3, W3) while maintaining a reception order of the packets of each stream (e.g., maintaining the order of V1->V2->V3 for the fourth stream, and the order of W1->W2->W3 for the fifth stream).

At stage 330 in FIG. 3, the network interface driver can transfer the descriptors (e.g., W1, W2, V1, V2, V3, W3) associated with the received first set of data packets to the data traffic shaping module 166.

Figure 7B:
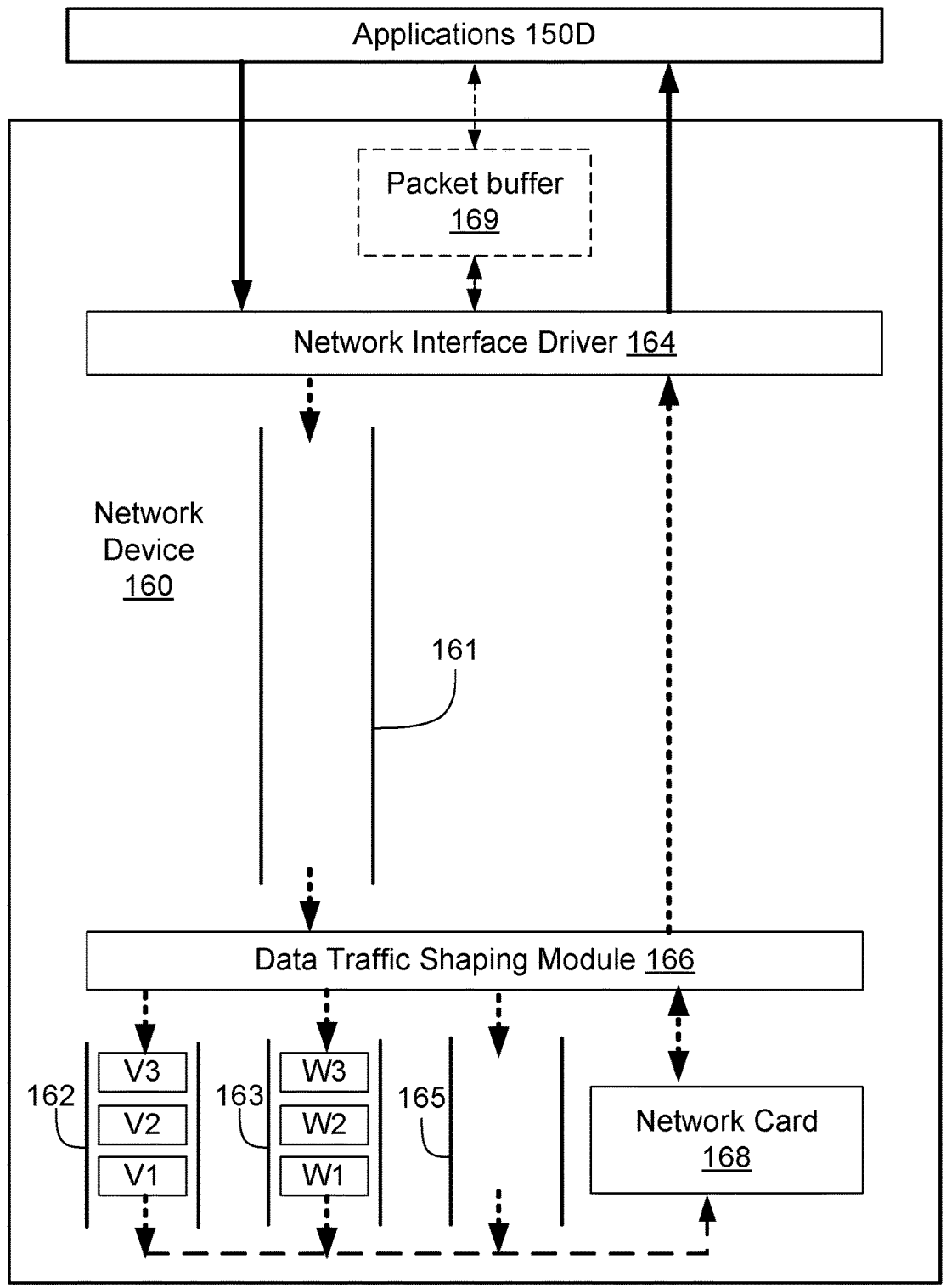

Referring to FIG. 4, at stage 410, the data traffic shaping module maintains a plurality of traffic shaping queues and receives the descriptors of data packets transferred by the network interface driver from a primary transmission queue. Referring to FIGS. 7A and 7B, in response to the network interface driver 164 transferring descriptors associated with received data packets to the data traffic shaping module 166 (e.g., W1, W2, V1, V2, V3, and W3), the data traffic shaping module 166 receives the transferred descriptors of the data packets from the primary transmission queue 161.

At stage 420 in FIG. 4, the data traffic shaping module classifies the data packets associated with the received descriptors. In some implementations, for example as shown in FIG. 7B, the data traffic shaping module 166 classifies the data packets associated with the received descriptors based on a set of classification rules for mapping characteristics of each stream to a corresponding traffic shaping queue.

At stage 430 in FIG. 4, the data traffic shaping module can determine whether transmission by the network card of a first data packet associated with a received first descriptor is to be delayed. Transmission of a packet is delayed if its classification results in its being assigned to a traffic shaping queue already storing unsent packets (or descriptors thereof).

At stage 440 in FIG. 4, if the data traffic shaping module determines that transmission by the network card of a first data packet associated with a received first descriptor is to be delayed, the data traffic shaping module removes the first descriptor associated with the first data packet from the primary transmission queue and stores the first descriptor in a corresponding traffic shaping queue based on a result of the classification. For example, referring to FIGS. 7A and 7B, in response to determination that transmission by the network card 168 of the data packet associated with the descriptors W1 and W2 of the fifth stream is to be delayed, the data traffic shaping module 166 removes the descriptors W1 and W2 from the primary transmission queue 161 and stores the descriptors W1 and W2 in the traffic shaping queue 163.

At stage 450 in FIG. 4, the data traffic shaping module causes the network card to transmit the data packets associated with descriptors stored in the traffic shaping queues according to transmission rate rules associated with the respective traffic shaping queues. For example, referring to FIGS. 7B-7D, the data traffic shaping module 166 causes the network card 168 to transmit the data packets associated with the descriptors W1, W2 and W3 stored in the traffic shaping queue 163 in a delayed manner according to the transmission rate rules associated with the traffic shaping queue 163.

At stage 460 in FIG. 4, if the data traffic shaping module determines that transmission by the network card of a first data packet associated with a received first descriptor is not to be delayed, the data traffic shaping module can cause the network card to immediately transmit the data packets associated with descriptors stored in the traffic shaping queues. For example, if a data packet is classified such that it is assigned to a traffic shaping queue having a transmission rate rule allowing for an unlimited transmission rate and the queue is empty, the data packet may be transmitted immediately without delay. Packets associated with the descriptors V1, V2 and V3 are treated as such in the example shown in FIGS. 7A-7D.

Figure 7C:
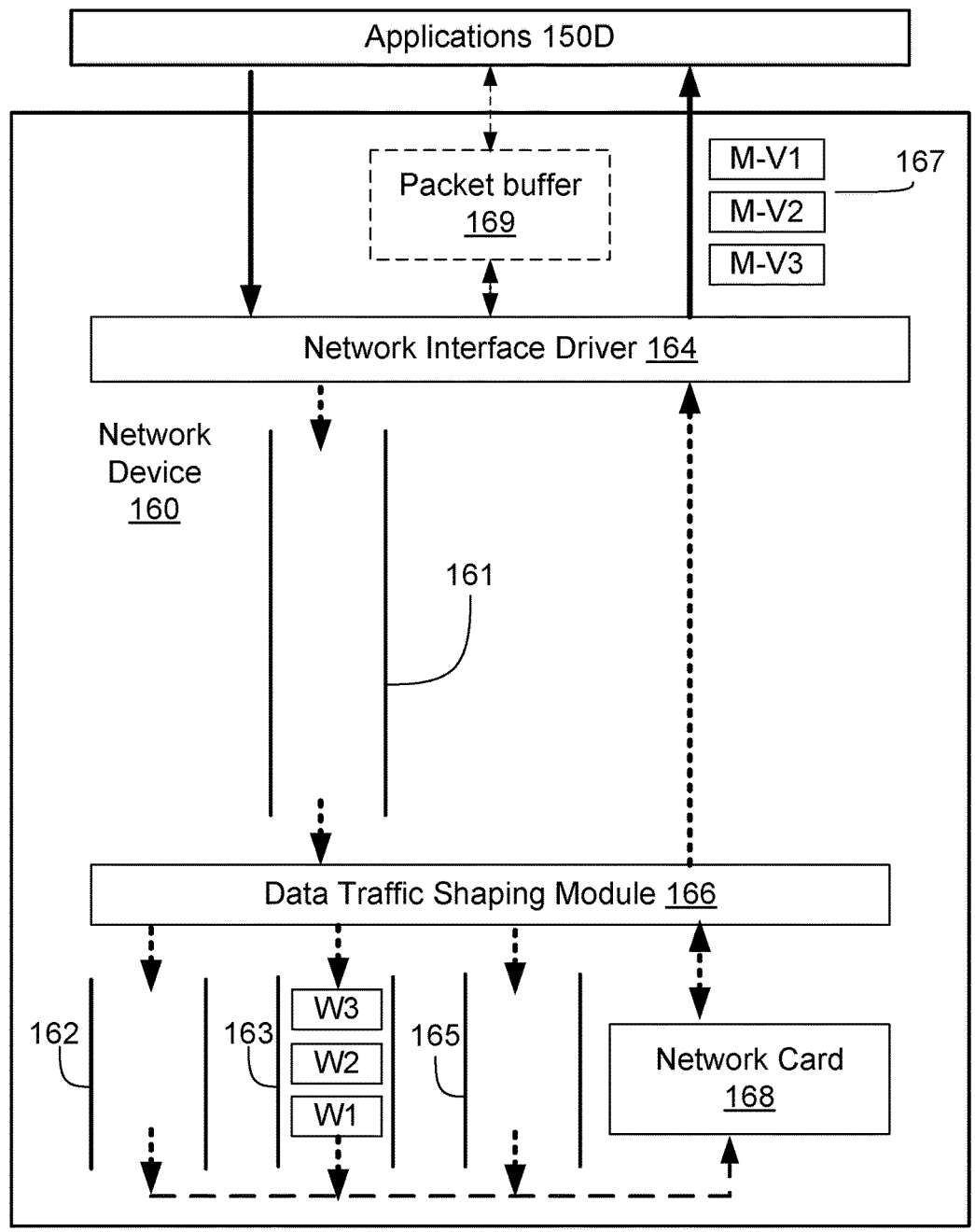

At stage 470 in FIG. 4, the data traffic shaping module can inform the network interface driver of successful transmission of data packets. For example, referring to FIG. 7C, in response to a successful completion of the (immediate) transmission of the data packets associated with the descriptors V1, V2 and V3 via the network card 168, the data traffic shaping module 166 informs the network interface driver 164 of the successful transmission of the data packets. In some implementations, as shown in FIG. 7C, the data traffic shaping module 166 can separately inform the network interface driver 164 of the successful transmission of each of the data packets associated with the descriptors V1, V2 and V3 by forwarding separate transmission completion messages to the network interface driver 164 for each packet.

Similar communications can be generated and forwarded for delayed transmissions. For example, referring to FIG. 7D, in response to a successful completion of the (delayed) transmission of the data packets associated with the descriptors W1, W2 and W3 via the network card 168, the data traffic shaping module 166 informs the network interface driver 164 of the successful transmission of the data packets.

At stage 510 in FIG. 5, the network interface driver determines whether a packet of the received first set of packets has been successfully transmitted by the network card. For example, referring to FIG. 7C, in response to a successful completion of the transmission of the data packets associated with the descriptors V1, V2 and V3 by the network card 168, the data traffic shaping module 166 informs the network interface driver 164 of the successful transmission of the data packets by communicating a single message or multiple messages. Based on notification of a successful transmission of data packets from the data traffic shaping module 166, the network interface driver 164 determines that each packet of the received packets has been successfully transmitted by the network card 168.

Figure 7D:
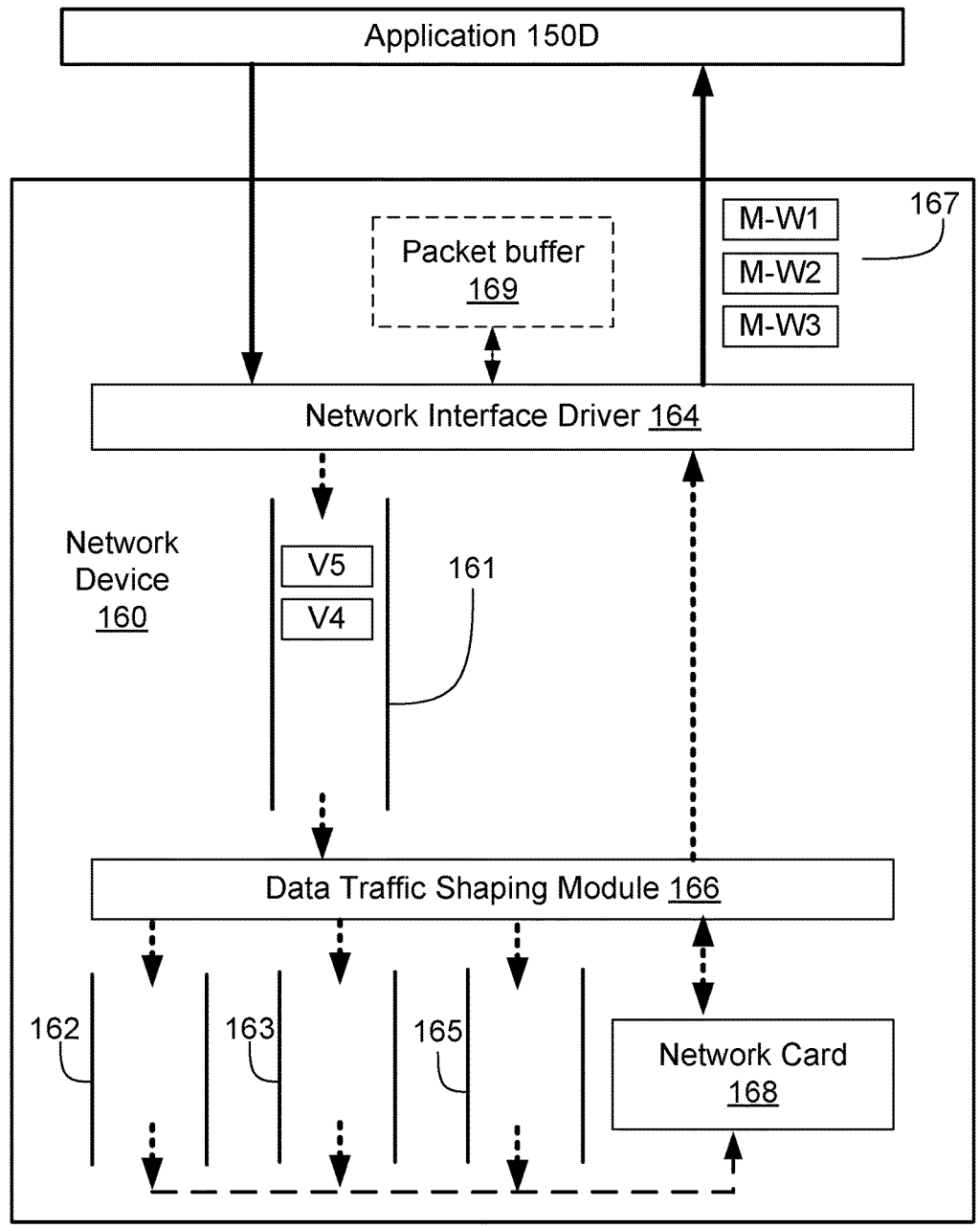

At stage 520 in FIG. 5, in response to the network interface driver determining that a packet of the received first set of packets has been successfully transmitted, the network interface driver communicates a packet transmission completion message to the application that has awaited receipt of a packet transmission completion message from the network interface driver before forwarding additional data packets to the network interface driver. For example, referring to FIG. 7C, in response to determination that the packet associated with the descriptor V1 of the fourth stream originally sent from the application 150D has been successfully transmitted by the network card 168, the network interface driver 164 communicates a packet transmission completion message 167 corresponding to the descriptor V1 (e.g., M-V1 in FIG. 7C) to the application 150D. Similarly, in response to determination that the packets associated with the descriptors V2 and V3 of the fourth stream originally sent from the application 150D have been successfully transmitted by the network card 168, the network interface driver 164 communicates two packet transmission completion messages 167 corresponding to the descriptors V2 and V3 (e.g., M-V2 and M-V3 in FIG. 7C) to the application 150D. In some implementations, the application 150D can be configured to await receipt of a packet transmission completion message from the network interface driver 164 before forwarding additional data packets to the network interface driver 164. In some implementations, each of the application 150D can be configured to await receipt of a transmission completion message for a data packet of a particular stream from the network interface driver 164 before forwarding additional data packets of the same stream to the network interface driver 164. For example, as shown in FIG. 7C, the application 150D awaits receipt of a transmission completion message for a data packet of the third stream corresponding to the descriptor V1 from the network interface driver 164. Referring to FIG. 7D, in response to receiving by the application 150D the transmission completion message corresponding to the descriptor V1, the application 150D forwards additional data packets of the same fourth stream (e.g., data packets corresponding to descriptors V4 and V5 as shown in FIG. 7D) to the network interface driver 164. In this manner, the application 150D can maintain, in the primary transmission queue, a small number of packets (e.g., 1 or 2 or 3 packets) per stream by sending additional packets to the network interface driver 164 only when it receives a packet transmission completion message that a packet of the same stream has been transmitted by the network card 168.

Referring FIGS. 7A-7D, generally, network traffic belongs to multiple flows or streams (e.g., packets of the fourth stream corresponding to the descriptors V1, V2, V3 and packets of the fifth stream corresponding to the W1, W2, W3). Each flow/stream may belong to a specific application (e.g., the application 150D) or destined to a specific remote location. For example, multiple flows/streams belong to the same application (e.g., the application 150D in FIGS. 7A-7D) or belong to different applications (e.g., the applications 150A-150C in FIGS. 6A-6D). At any given time, a network device may handle hundreds or thousands or billions of different flows/streams, and sometimes, traffic for a specific destination or traffic for a specific application may need to be slowed down. Referring to FIGS. 7A-7D, in some implementations, the data traffic shaping module 166 can rate-limit or traffic-shape different flows/streams sent from the same application 150D independently without head of line blocking by attaching queues corresponding to the flows/streams (e.g., the traffic shaping queues 162 and 163) and slowing down all traffic sent through the same queue (e.g., slowing down all packets associated with the descriptors W1, W2, W3 sent through the traffic shaping queue 163). With this configuration, regardless of how flows are put on those queues by applications (e.g., multiple flows are received from corresponding different applications, as shown in FIGS. 6A-6D, or from the same application, as shown in FIGS. 7A-7D), flows can be selectively slowed down, without creating head of line blocking or dropping any packets, and without need of each application to be aware of how the traffic sent from each application can be classified and traffic-shaped.

Figure 8A:
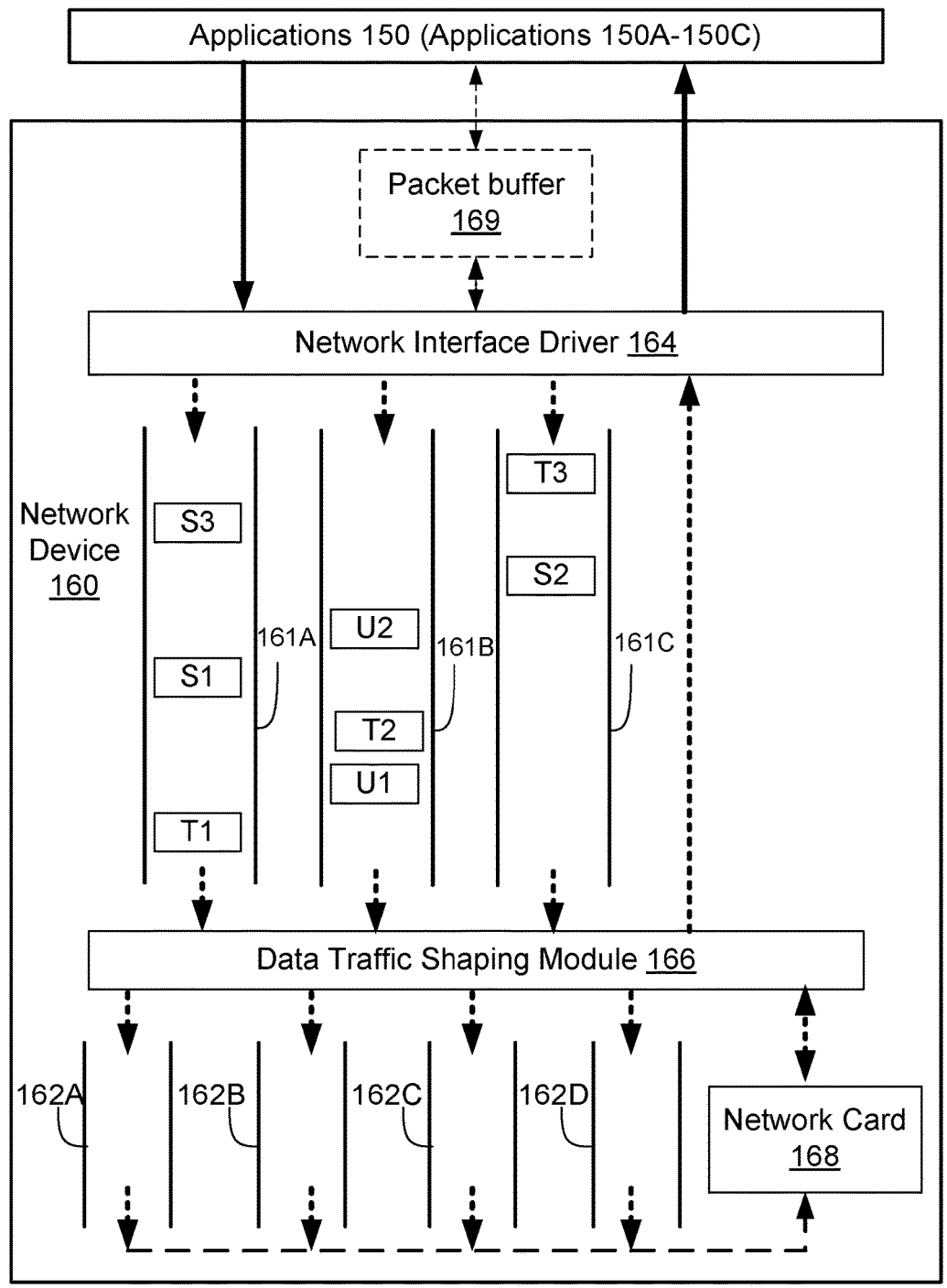
FIGS. 8A-8C are block diagrams representing examples of operations of a data traffic shaping system according to some implementations.
Figure 8B:
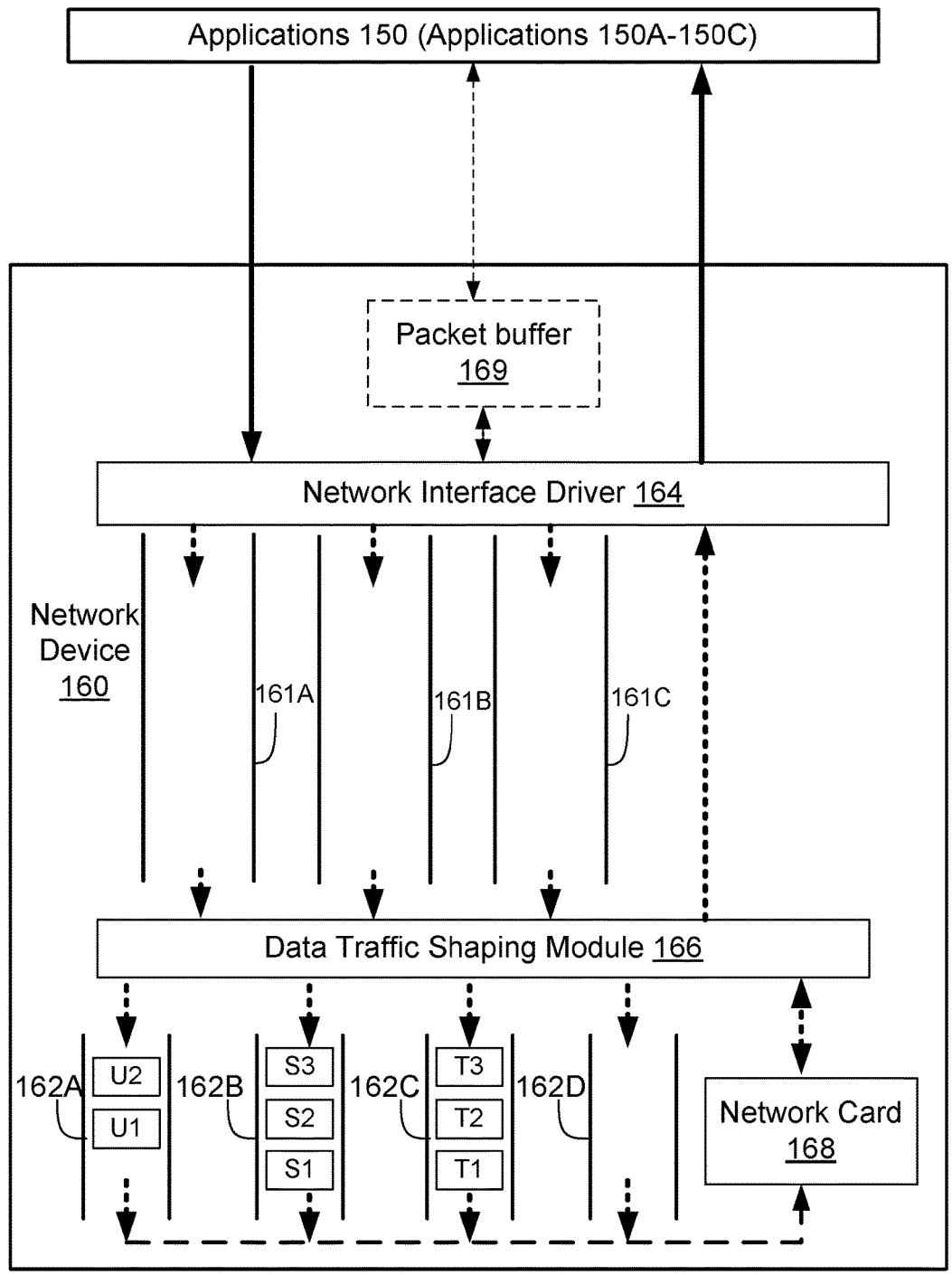
Figure 8C:
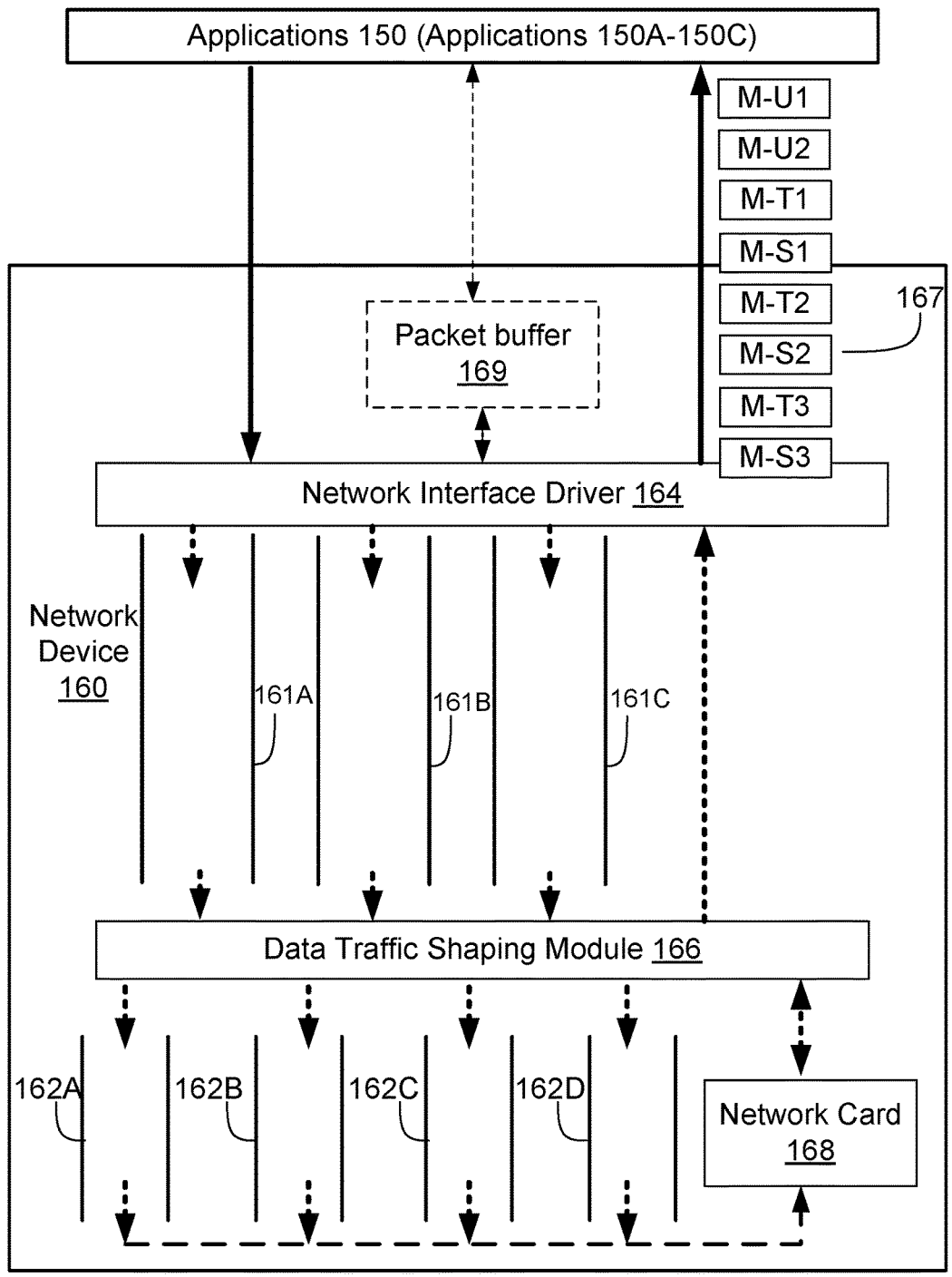

The methods shown in the flowcharts of FIGS. 3-5 are also described below with reference to FIGS. 8A-8C, which are block diagrams representing examples of operations of a data traffic shaping system according to some implementations. In FIGS. 8A-8C, the same reference numbers as FIGS. 6A-6D are used, with like descriptions omitted. FIGS. 8A-8C shows operations of a data traffic shaping system when the primary transmission queue 161 is a set of primary transmission queues 161A-161C. For example, the primary transmission queue 161 can be multiple queues implemented in multi-queue NICs. In some implements, the number of the set of primary transmission queues 161A-161C is smaller than the number of rate limiters or traffic shaping queues 162A-162D. For example, to shape thousands of flows or streams, the network device 110 can have 10~32 hardware queues, while having many more traffic shaping queues installed therein to shape the thousands of flows.

At stage 310 in FIG. 3, the network interface driver can receive a set of data packets generated and forwarded by the applications 150 for transmission by a network card. For example, referring to FIG. 8A, the network interface driver 164 receives a set of data packets generated and forwarded by the applications 150A-150C for transmission by the network card 168. In the example shown in FIG. 8A, the application 150A sends three packets of a first stream, in sequential order, corresponding to descriptors S1, S2 and S3. The application 150B sends, in sequential order, three packets of a second stream corresponding to descriptors T1, T2 and T3. The application 150C sends two packets of a third stream corresponding to descriptors U1 and U3. In some implementations, the network interface driver 164 receives the data packets in the order the packets were sent by the applications 150 (e.g., T1, followed by U1, followed by T2, followed by S1, followed by U2, followed by S2, followed by S3, followed by T3).

At stage 320 in FIG. 3, the network interface driver can store descriptors associated with the received first set of data packets in the set of the primary transmission queues 161A-161C. In some implementations, the network interface driver 164 randomly selected one of the primary transmission queues 161A-161C for each received data packet and writes the corresponding descriptor in the selected transmission queue among the primary transmission queue 161. For example, referring to FIG. 8A, the network interface driver 164 writes the descriptors T1, S1 and S3 (in the order of T1, S1 and S3) in the primary transmission queue 161A, the descriptors U1, T2 and U2 (in the order of U1, T2 and U2) in the primary transmission queue 161B, and the descriptors T2, S2 and T3 (in the order of S2 and T3) in the primary transmission queue 161C. In some implementations, in each primary transmission queue, packets of different streams can be interleaved while maintaining a reception order of packets in each stream. For example, in the example shown in FIG. 8A, in the primary transmission queue 161A, packets of different streams are interleaved (i.e., in the order of T1, S1, S3) while maintaining a reception order of the packets of each stream (e.g., maintaining the order of S1->S3 for the third stream).

At stage 330 in FIG. 3, the network interface driver 164 can transfer the descriptors associated with the received first set of data packets and stored in each primary transmission queue (e.g., T1, S1, S3 stored in the primary transmission queue 161A) to the data traffic shaping module 166.

Referring to FIG. 4, at stage 410, the data traffic shaping module maintains a plurality of traffic shaping queues and receives the descriptors of data packets transferred by the network interface driver from each of the primary transmission queues 161A-161C. Referring to FIGS. 8A and 8B, in response to the network interface driver 164 transferring descriptors associated with received data packets to the data traffic shaping module 166, the data traffic shaping module 166 receives descriptors of the data packets (e.g., the descriptors T1, S1, S3) from the primary transmission queue 161A, descriptors of the data packets (e.g., the descriptors U1, T2, U2) from the primary transmission queue 161B, and descriptors of the data packets (e.g., the descriptors S2, T3) from the primary transmission queue 161C. In some implementations, the data traffic shaping module maintains a plurality of traffic shaping queues and receives the descriptors of data packets transferred by the network interface driver from each primary transmission queue. For example, referring to FIGS. 8A-8C, the data traffic shaping module 166 maintains a plurality of traffic shaping queues (e.g., traffic shaping queues 162A-162D).

At stage 420 in FIG. 4, the data traffic shaping module 166 classifies the data packets associated with the received descriptors from each primary transmission queue. At stage 430, the data traffic shaping module 166 can determine whether transmission by the network card of a first data packet associated with a received first descriptor is to be delayed. Transmission of a packet is delayed if its classification results in its being assigned to a traffic shaping queue already storing unsent packets (or descriptors thereof).

At stage 440 in FIG. 4, if the data traffic shaping module determines that transmission by the network card of a first data packet associated with a received first descriptor is to be delayed, the data traffic shaping module removes the first descriptor associated with the first data packet from each primary transmission queue and stores the first descriptor in a corresponding traffic shaping queue based on a result of the classification. For example, referring to FIGS. 8A and 8B, for the primary transmission queue 161A, the data traffic shaping module determines that transmissions by the network card 168 of the data packets associated with the descriptors T1, S1, S3 stored in the primary transmission queue 161A are to be delayed. In response to determination that transmission by the network card 168 of the data packet associated with the descriptor T1 of the second stream is to be delayed, the data traffic shaping module 166 removes the descriptor T1 from the primary transmission queue 161A and stores the descriptor T1 in the traffic shaping queue 162C. Similarly, the data traffic shaping module 166 removes the descriptor S1 of the first stream from the primary transmission queue 161A and stores the descriptor S1 in the traffic shaping queue 162B. The data traffic shaping module 166 also removes the descriptor S3 from the primary transmission queue 161A and stores the descriptor S3 in the traffic shaping queue 162B. In a similar manner, as shown in FIGS. 8A and 8B, for the primary transmission queue 161B, the data traffic shaping module 166 removes the descriptor U1 of the third stream from the primary transmission queue 161B and stores the descriptor U1 in the traffic shaping queue 162A, removes the descriptor T2 of the second stream from the primary transmission queue 161B and stores the descriptor T2 in the traffic shaping queue 162C, and removes the descriptor U2 of the third stream from the primary transmission queue 161B and stores the descriptor U2 in the traffic shaping queue 162A. In a similar manner, as shown in FIGS. 8A and 8B, for the primary transmission queue 161C, the data traffic shaping module 166 removes the descriptor S2 of the first stream from the primary transmission queue 161C and stores the descriptor S2 in the traffic shaping queue 162B, and removes the descriptor T3 of the second stream from the primary transmission queue 161C and stores the descriptor T3 in the traffic shaping queue 162C.

At stage 450 in FIG. 4, the data traffic shaping module causes the network card to transmit the data packets associated with descriptors stored in the traffic shaping queues according to transmission rate rules associated with the respective traffic shaping queues. For example, referring to FIGS. 8B-8C, the data traffic shaping module 166 causes the network card 168 to transmit the data packets associated with the descriptors S1, S2 and S3 stored in the traffic shaping queue 162B in a delayed manner according to the transmission rate rules associated with the traffic shaping queue 162B. The data traffic shaping module 166 also can cause the network card 168 to transmit the data packets associated with the descriptors T1, T2 and T3 stored in the traffic shaping queue 162C in a delayed manner according to the transmission rate rules associated with the traffic shaping queue 162C.

At stage 460 in FIG. 4, if the data traffic shaping module determines that transmission by the network card of a first data packet associated with a received first descriptor is not to be delayed, the data traffic shaping module can cause the network card to immediately transmit the data packets associated with descriptors stored in the traffic shaping queues. For example, if a data packet is classified such that it is assigned to a traffic shaping queue having a transmission rate rule allowing for an unlimited transmission rate and the queue is empty, the data packet may be transmitted immediately without delay. Packets associated with the descriptors U1 and U2 are treated as such in the example shown in FIGS. 8A-8C.

At stage 470 in FIG. 4, the data traffic shaping module can inform the network interface driver of successful transmission of data packets. For example, referring to FIGS. 8B and 8C, in response to a successful completion of the (immediate) transmission of the data packets associated with the descriptors U1 and U2 via the network card 168, the data traffic shaping module 166 informs the network interface driver 164 of the successful transmission of the data packets. For example, referring to FIGS. 8B and 8C, in response to a successful completion of the (delayed) transmission of the data packets associated with the descriptors T1, S1, T2, S2, T3 and S3 via the network card 168, the data traffic shaping module 166 informs the network interface driver 164 of the successful transmission of the data packets.

Referring to FIG. 5, at stage 510, the network interface driver determines whether a packet of the received first set of packets has been successfully transmitted by the network card.

At stage 520, in response to the network interface driver determining that a packet of the received first set of packets has been successfully transmitted, the network interface driver communicates a packet transmission completion message to the application that has awaited receipt of a packet transmission completion message from the network interface driver before forwarding additional data packets to the network interface driver. For example, referring to FIG. 8C, in response to determination that the packet associated with the descriptor U1 of the third stream originally sent from the application 150C has been successfully transmitted by the network card 168, the network interface driver 164 communicates a packet transmission completion message 167 corresponding to the descriptor U1 (e.g., M-U1 in FIG. 8C) to the application 150C. Similarly, in response to determination that the packet associated with the descriptor U2 of the third stream originally sent from the application 150C has been successfully transmitted by the network card 168, the network interface driver 164 communicates a packet transmission completion message 167 corresponding to the descriptor U2 (e.g., M-U2 in FIG. 8C) to the application 150C.

Similarly, in some implementations, in response to receiving, from the data traffic shaping module 166, a message (not shown) indicating the successful transmission of the data packets associated with the descriptors T1, S1, T2, S2, T3 and S3, the network interface driver 164 can generate six separate transmission completion messages (e.g., M-T1, M-S1, M-T2, M-S2, M-T3 and M-S3 in FIG. 8C) and communicate each message to a corresponding packet source in the order of the successful transmission of the data packets (e.g., in the order of T1, S1, T2, S2, T3 and S3).

Referring to FIG. 8C, in some implementations, each of the applications 150 can be configured to await receipt of a packet transmission completion message from the network interface driver 164 before forwarding additional data packets to the network interface driver 164. In some implementations, each of the applications 150 can be configured to await receipt of a transmission completion message for a data packet of a particular stream from the network interface driver 164 before forwarding additional data packets of the same stream to the network interface driver 164.

Referring to FIGS. 8A-8C, in some implementations, the applications 150 or the network interface driver 164 may spread flows/streams and their corresponding packets over the set of primary transmission queues 161A-161C in any manner they are configured (e.g., random spreading over the queues or round-robin spreading over the queues). In some implementations, the applications 150 or the network interface driver 164 may spread flows/streams and their corresponding packets over the set of primary transmission queues in the same manner irrespective of the number of the primary transmission queues. In some implementations, the applications 150 or the network interface driver 164 are configured not to be aware of the implementation details of the data traffic shaping module 166, the traffic shaping queues 162A-162D, and how traffic is classified in those queues. For example, traffic from an application executing in a virtual machine can be shaped or rate limited without head of line blocking and without informing an administrator of the virtual machine of the details of traffic shaping queues and classification rules on each queue. With the configuration illustrated in FIGS. 8A-8C, packets can leave the primary transmission queues as fast as possible and can be classified in the traffic shaping queues without returning a completion message upon the packets leaving the primary transmission queues. In some implementations, as shown in FIGS. 8A-8C, a completion message is not returned until the packet leaves the traffic shaping queues, so that completion messages are returned out of order, i.e., in an order different from the order the packets are saved in the primary transmission queues, and not in FIFO, thereby allowing an application sending faster flows to send more additional packets than another application sending slower flows. Referring to FIGS. 8A-C, where the data traffic shaping module 166 is implemented in a system having multiple primary transmission queues 161A-161C, the network interface driver 164 can return "out of order" completion messages (for example, the order of completion messages M-U1, M-U2, M-T2 is different from the order in which the corresponding packets are saved in the primary transmission queue 161B, i.e., U1, T2, U2; see FIGS. 8A and 8C) whether each packet is put in a right queue based on predetermined queue assignment rules or packet traffic is "randomly" spread over the queues.

FIG. 9 is a block diagram of an example computing system 140. The example computing system 140 is suitable for use in implementing the computerized components described herein, in accordance with an illustrative implementation. In broad overview, the computing system 140 includes at least one processor 148 for performing actions in accordance with instructions and one or more memory devices 144 or 149 for storing instructions and data. The illustrated example computing system 140 includes one or more processors 148 in communication, via a bus 142, with memory 144, at least one network interface controller 143 with network interface port 146 for connection to a network (not shown), and other components 145, e.g., input/output ("I/O") components 147. Generally, the processor(s) 148 will execute instructions received from memory. The processor(s) 148 illustrated incorporate, or are directly connected to, cache memory 149. In some instances, instructions are read from memory 144 into cache memory 149 and executed by the processor(s) 148 from cache memory 149.

In more detail, the processor(s) 148 may be any logic circuitry that processes instructions, e.g., instructions fetched from the memory 144 or cache 149. In many implementations, the processor(s) 148 are microprocessor units or special purpose processors. The computing device 140 may be based on any processor, or set of processors, capable of operating as described herein. The processor(s) 148 may be single core or multi-core processor(s). The processor(s) 148 may be multiple distinct processors.

The memory 144 may be any device suitable for storing computer readable data. The memory 144 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 140 may have any number of memory devices 144.

The cache memory 149 is generally a form of computer memory placed in close proximity to the processor(s) 148 for fast read times. In some implementations, the cache memory 149 is part of, or on the same chip as, the processor(s) 148. In some implementations, there are multiple levels of cache 149, e.g., L2 and L3 cache layers.

The network interface controller 143 manages data exchanges via the network interface 146 (sometimes referred to as network interface ports). The network interface controller 143 handles the physical and data link layers of the OSI model for network communication. In some implementations, some of the network interface controller's tasks are handled by one or more of the processor(s) 148. In some implementations, the network interface controller 143 is part of a processor 148. In some implementations, a computing system 140 has multiple network interfaces 146 controlled by a single controller 143. In some implementations, a computing system 140 has multiple network interface controllers 143. In some implementations, each network interface 146 is a connection point for a physical network link (e.g., a cat-5 Ethernet link). In some implementations, the network interface controller 143 supports wireless network connections and an interface port 146 is a wireless (e.g., radio) receiver/transmitter (e.g., for any of the IEEE 802.11 protocols, near field communication "NFC", Bluetooth, ANT, or any other wireless protocol). In some implementations, the network interface controller 143 implements one or more network protocols such as Ethernet. Generally, a computing device 140 exchanges data with other computing devices via physical or wireless links through a network interface 146. The network interface 146 may link directly to another device or to another device via an intermediary device, e.g., a network device such as a hub, a bridge, a switch, or a router, connecting the computing device 140 to a data network such as the Internet.

The computing system 140 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

The other components 145 may include an I/O interface, external serial device ports, and any additional co-processors. For example, a computing system 140 may include an interface (e.g., a universal serial bus (USB) interface) for connecting input devices, output devices, or additional memory devices (e.g., portable flash drive or external media drive). In some implementations, a computing device 140 includes an additional device 145 such as a co-processor, e.g., a math co-processor can assist the processor 148 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A network device, comprising:
 a network card,
 at least one processor;
 memory;
 a network interface driver executing on the at least one processor configured to:
  receive a first set of data packets generated and forwarded by a software application for transmission by the network card;
  store descriptors associated with the received first set of data packets in a primary transmission queue in a first order;
  transfer the descriptors associated with the received first set of data packets to a data traffic shaping module executing on one of the network card and the at least one processor; and
  in response to determining that a packet of the received first set of packets has been successfully transmitted by the network card, communicate a packet transmission completion message to the software application that has awaited receipt of a packet transmission completion message from the network interface driver before forwarding additional data packets to the network interface driver, and
 the data traffic shaping module being configured to:
  maintain a plurality of traffic shaping queues, wherein each traffic shaping queue has at least one associated transmission rate rule;
  receive the descriptors of data packets transferred by the network interface driver from the primary transmission queue;
  classify the data packets associated with the received descriptors;
  determine that transmission by the network card of a first data packet associated with a received first descriptor is to be delayed, and responsive to such determination, remove the first descriptor associated with the first data packet from the primary transmission queue and store the first descriptor in a corresponding traffic shaping queue based on a result of the classification;
  cause the network card to transmit the data packets associated with descriptors stored in the traffic shaping queues according to the transmission rate rules associated with the respective traffic shaping queues; and
  inform the network interface driver of successful transmission of data packets in a second order different from the first order.

2. The network device of claim 1, wherein the network shaping module is included as a portion of one of the network card and a real operating system executing on the at least one processor.

3. The network device of claim 1, wherein the network interface driver is included within a real operating system executing on the at least one processor and is configured to communicate with the software application via a guest operating system.

4. The network device of claim 1, wherein the network interface driver is included within a first layer of a transmission control protocol (TCP) stack of an operating system executing on the at least one processor and is configured to communicate with a software application that is included in an upper layer of the TCP stack.

5. The network device of claim 1, wherein the network card is configured to:
 transmit the first data packet by using a first resource; and
 responsive to transmitting the first data packet, release the first resource to cause the first resource to be accessible by the software application.

6. The network device of claim 5, wherein the first resource is a portion of a memory buffer.

7. The network device of claim 1, wherein the data traffic shaping module is further configured to:
 receive, after receiving the first descriptor, a second descriptor associated a second data packet, and
 determine that transmission by the network card of a second data packet associated with the received second descriptor is not to be delayed, and responsive to such determination, cause, before transmitting the first data packet, the network card to transmit the second data packet associated with the second descriptor stored in the primary transmission queue.

8. The network device of claim 1, wherein the network card is configured to transmit a plurality of packets out of an order of storing the plurality of packets in the primary transmission queue.

9. The network device of claim 1, wherein the data traffic shaping module is further configured to:
determine that transmission by the network card of a data packet in a first stream is to be delayed, and responsive to such determination, store the descriptor associated with the data packet in the first stream in a first one of the traffic shaping queues, and
determine that transmission by the network card of a data packet in a second stream, different from the first stream, is to be delayed, and responsive to such determination, store the descriptor associated with the data packet in the second stream in a second one of the traffic shaping queues.

10. The network device of claim 9, wherein the network card is configured to:
transmit a plurality of packets stored in the first traffic shaping queue in an order of storing the plurality of packets in the first traffic shaping queue; and
transmit a plurality of packets stored in the second traffic shaping queue in an order of storing the plurality of packets in the second traffic shaping queue.

11. A method, comprising:
receiving, by a network interface driver executing on an at least one processor, a first set of data packets generated and forwarded by a software application for transmission by a network card;
storing, by the network interface driver, descriptors associated with the received first set of data packets in a primary transmission queue in a first order;
transferring by the network interface driver, the descriptors associated with the received first set of data packets to a data traffic shaping module executing on one of the network card and the at least one processor;
in response to determining that a packet of the received first set of packets has been successfully transmitted by the network card, communicating, by the network interface driver, a packet transmission completion message to the software application that has awaited receipt of a packet transmission completion message from the network interface driver before forwarding additional data packets to the network interface driver;
maintaining, by the data traffic shaping module, a plurality of traffic shaping queues, wherein each traffic shaping queue has at least one associated transmission rate rule;
receiving, by the data traffic shaping module, the descriptors of data packets transferred by the network interface driver from the primary transmission queue;
classifying, by the data traffic shaping module, the data packets associated with the received descriptors;
determining, by the data traffic shaping module, that transmission by the network card of a first data packet associated with a received first descriptor is to be delayed, and responsive to such determination, removing the first descriptor associated with the first data packet from the primary transmission queue and storing the first descriptor in a corresponding traffic shaping queue based on a result of the classification;
causing, by the data traffic shaping module, the network card to transmit the data packets associated with descriptors stored in the traffic shaping queues according to the transmission rate rules associated with the respective traffic shaping queues; and
informing, by the data traffic shaping module, the network interface driver of successful transmission of data packets in a second order different from the first order.

12. The method of claim 11, wherein the network shaping module is included as a portion of one of the network card and a real operating system executing on the at least one processor.

13. The method of claim 11, wherein the network interface driver is included within a real operating system executing on the at least one processor and is configured to communicate with the software application via a guest operating system.

14. The method of claim 11, wherein the network interface driver is included within a first layer of a transmission control protocol (TCP) stack of an operating system executing on the at least one processor and is configured to communicate with a software application that is included in an upper layer of the TCP stack.

15. The method of claim 11, further comprising:
transmitting, by the network card, the first data packet by using a first resource; and
responsive to transmitting the first data packet, releasing by the network card the first resource to cause the first resource to be accessible by the software application.

16. The method of claim 15, wherein the first resource is a portion of memory buffer.

17. The method of claim 11, further comprising:
receiving, by the data traffic shaping module, after receiving the first descriptor, a second descriptor associated a second data packet; and
determining, by the data traffic shaping module, that transmission by the network card of a second data packet associated with the received second descriptor is not to be delayed, and responsive to such determination, causing, before transmitting the first data packet, the network card to transmit the second data packet associated with the second descriptor stored in the primary transmission queue.

18. The method of claim 11, further comprising:
transmitting, by the network card, a plurality of packets out of an order of storing the plurality of packets in the primary transmission queue.

19. The method of claim 11, further comprising:
determining, by the data traffic shaping module, that transmission by the network card of a data packet in a first stream is to be delayed, and responsive to such determination, storing the descriptor associated with the data packet in the first stream in a first one of the traffic shaping queues, and
determine, by the data traffic shaping module, that transmission by the network card of a data packet in a second stream, different from the first stream, is to be delayed, and responsive to such determination, storing the descriptor associated with the data packet in the second stream in a second one of the traffic shaping queues.

20. The method of claim 19, further comprising:
transmitting, by the network card, a plurality of packets stored in the first traffic shaping queue in an order of storing the plurality of packets in the first traffic shaping queue; and transmitting, by the network card, a plurality of packets stored in the second traffic shaping queue in an order of storing the plurality of packets in the second traffic shaping queue.

* * * * *